US005144495A

United States Patent [19]

Merton et al.

[11] Patent Number: 5,144,495

[45] Date of Patent: Sep. 1, 1992

[54] SYSTEMS FOR ILLUMINATING AND EVALUATING SURFACES

[75] Inventors: Henry A. Merton, Slidell; James R. Diefenthal, New Orleans; William D. Radigan, New Orleans; Soumitra Sengupta, New Orleans; Emmett J. Lenaz, Jr., New Orleans, all of La.

[73] Assignee: Compugrade, Inc, New Orleans, La.

[21] Appl. No.: 755,023

[22] Filed: Sep. 4, 1991

Related U.S. Application Data

[60] Division of Ser. No. 473,744, Feb. 1, 1990, which is a continuation-in-part of Ser. No. 128,494, Dec. 3, 1987, Pat. No. 4,899,392.

[51] Int. Cl.[5] .......... G02B 27/02

[52] U.S. Cl. .......... 359/798; 359/863; 359/389; 359/385; 362/138

[58] Field of Search .......... 359/798, 799, 800, 801, 359/862, 863, 868, 869, 871, 872, 849, 850, 851, 385, 389, 390; 362/5, 18, 138, 142, 144; 356/30, 31, 243

[56] References Cited

U.S. PATENT DOCUMENTS 3,170,983 2/1965 Riedd .......... 359/385
4,455,592 6/1984 Martino .......... 359/385
4,863,253 9/1989 Shafer et al. .......... 359/863
4,925,301 5/1990 Rafanelli .......... 359/851

*Primary Examiner*—Loha Ben
*Attorney, Agent, or Firm*—Heslin & Rothenberg

[57] ABSTRACT

Systems and methods for illuminating an object surface with light at varying angles of incidence and for optically evaluating the object surface for features and defects, etc. are disclosed. In a specific implementation the systems and methods, the target object comprises a coin and the illumination and evaluation techniques are used to accurately objectively evaluate the numismatic quality of the coin and/or identify the coin. Central to the illumination and evaluation techniques is the ability to apply a uniform confined beam of light to the surface of the target object to be imaged. The confined angles of incidence of the beam of light includes a perpendicular component angle of incidence range and a parallel component angle of incidence range relative to the object surface. The component ranges are defined such a light beam illuminates the object surface from a well-defined direction. The direction and the extent of light beam illumination may be varied by redefining one or both of the component angle of incidence ranges. In addition to identifying features and defects of a coin surface, the illumination and evaluation techniques are capable of imaging the surface lustre of the coin.

20 Claims, 15 Drawing Sheets

SYSTEMS FOR ILLUMINATING AND EVALUATING SURFACES

CROSS-REFERENCE TO RELATED APPLICATION

This application is a divisional of U.S. Ser. No. 473,744, filed Feb. 1, 1990, which is a continuation-in-part of U.S. Ser. No. 128,494, filed Dec. 3, 1987, now U.S. Pat. No. 4,899,392, issued Feb. 6, 1990, the contents of each of which are hereby incorporated by reference into the subject application.

Background of the Invention

1. Technical Field

The invention relates to systems and methods for illuminating and evaluating surfaces. More particularly, the invention relates to systems and methods for illuminating an object's surface with light at varying angles of incidence and intensity and for optically evaluating the object surface for features and defects. In certain specific implementations of the systems and methods, the target object comprises a coin and the systems and methods are used to accurately objectively evaluate the numismatic quality of the coin and/or identify the coin.

2. Definitions

The following terms and phrases are used herein in accordance with the following meanings:

1. Coins—collectible pieces, including metallic money, tokens, medals, medallions, rounds, etc.

2. Obverse/Reverse—obverse is the side of a coin bearing the more important legends or types; its opposite side is the reverse.

3. Circulated/Uncirculated—circulation is the act of transferring a coin from place to place or person to person in the normal course of business; the term "uncirculated" is interchangeable with "mint state" and refers to a coin which has never been circulated.

4. Detracting Marks—marks on an object which have occurred after manufacture, or unintentional marks that occurred during manufacture of the object. As used herein, detracting marks include High Angle Impact Marks and Lustre Interruption Marks. High Angle Impact Marks (HAIMs) are significant digs or scratches on the surface of the object under evaluation. The "angle" refers to the inclination of the surface of the mark with respect to the object surface. Light striking such a mark will reflect specularly from the mark at an angle markedly different than that of light striking the undisturbed surface. Lustre Interruption Marks (LIMs) principally comprise wear or abrasions on the surface of the target object. For a normal lustrous coin surface, applicants have discovered that a Lustre Interruption Mark reflects light according to Snell's laws of reflection. This interaction is distinctly different than the complex interaction caused by uninterrupted lustre described below.

5. Lustre—is the effect of microscopic, radial die marks created by the centrifugal flow of metal when the planchet is struck by the forming dies. These die marks form radially arranged tightly packed facets which reflect light in complex ways. The angle, dispersion and strength of the reflected light depends on the strength and orientation of the lustre which varies from coin to coin and varies on the surface of the coin itself.

6. Strength of Strike—refers to the sharpness of design details within an object such as a coin. A sharp strike or strong strike is one with all the details of the die are-impressed clearly into the coin; a weak strike has the details lightly impressed at the time of coining.

7. Angles of incidence—as used herein refers to the direction of a controllable beam of light relative to the surface normal of an object to be illuminated and evaluated. Angles of incidence include a perpendicular component range relative to the object surface (i.e., the range of angles defined by the incident light beam relative to the surface normal) and a parallel component range relative to the object surface (i.e., the range of angles defined by the incident light beam in a plane parallel to the surface). As explained herein, both the perpendicular and parallel component ranges of the angles of light beam incidence are controllable.

3. Description of the Prior Art

Although people have been collecting coins since the days of antiquity, it is only in recent times that coin values have greatly increased. One of the main determining factors of a coin's value is its grade, i.e., the condition or state of wear of the coin. A very small difference in grade can mean a large difference in price, thus making the exact grade of a coin important, especially today.

At present, two coin grading systems are prevalent. One expresses a coin's state in words or letters, the other uses a combination of letters and numbers. In the first system, the most important terms in ascending order are: good (G); very good (VG); fine (F); very fine (VF); extremely fine (EF), (XF); about uncirculated (AU); uncirculated or mint state (MS). The second system is based on an alphanumerical scale in which 1 represents the worst possible condition of preservation of a coin and 70 represents the best possible condition. In this system, a coin in uncirculated condition or mint state is referred to or categorized as an MS60 through MS70 coin. The monetary value of a coin does not increase linearly as the coin advances within the different levels or categories of coin grades. As much as 95% of the potential monetary value of a coin may rest in being classified as an "uncirculated" (MS60 through MS70). In fact, the difference between one or two grade levels within this class may affect the value of a coin anywhere from hundreds to thousands of dollars. Traditionally, a main difficulty inherent in classifying a coin within one of the above categories has been in defining the categories exactly. More serious, however, has been the difficulty inherent in matching a particular test coin with one of the predefined grade categories since all grading to date has at least in part involved a subjective evaluation(s) by an appraiser or numismatist.

Known methods for defining what is meant by a particular grade category either use textual descriptions, lined drawings, photographs or facsimile coins. With each of these methods, the category to which a coin is assigned ultimately depends to a large extent upon the numismatist conducting the evaluation. For example, textual descriptions of categories are susceptible to different interpretations by different individuals. Lined drawings often do not accurately represent the characteristics of actual coins and are normally utilized only to represent one particular type of defect or imperfection. Photographs and facsimile coins are often representative of a combination of types of defects which should be considered in evaluating coins, such as a photograph or facsimile coin illustrating visible wear and numerous bag marks. Clearly, such a guide provides a difficult standard and one which is open to various interpretations, especially, e.g., should no wear be visible but bag marks are present on the coin under evaluation.

Further, even if the grading system categories are understood by an individual, most, if not all, prior art methods of evaluating coins require the numismatist to subjectively match a particular test coin with a grade category. The principal factors to an accurate prior art appraisal of a coin are the appraiser's skill and experience, the lack of which can result in a particular coin being categorized significantly different than its true grade. However, even with an experienced appraiser, a particular coin may be categorized differently based upon environmental factors such as, for example, the time of day, the presence or absence of magnification, and the type and amount of lighting applied to the surface of the coin.

The problems inherent in subjective grading methods have been highlighted and intensified by the recent expansion of the number of grade system categories being used, e.g., from the three or four previously used uncirculated categories to the eleven (MS60 through MS70) now used by some appraisers. A commonly heard complaint in the grading industry is that it is simply impossible to consistently and accurately categorize a coin with such a large number of grade levels. In response to this, at least one grading firm is requiring that each submission be evaluated by five recognized numismatists and that four of the five independently agree as to the grade category of the coin. Although such a program does result in a more accurate grading of coins, it is obviously a very costly and time consuming operation.

Another approach to addressing the subjectiveness problems of today's coin grading techniques is disclosed by Mason in U.S. Pat. No. 4,191,472. In Mason, apparatus is provided to assist an individual in evaluating some of the more important factors which influence the grade of a coin. This apparatus comprises sets of facsimile coins, for a given class or issue, representative of particular types of coin defects or imperfections. The facsimile coins within each set are arranged according to increasing or decreasing extents to which the coin defect is exhibited. Each of the facsimile coins has assigned to it a number representative of the relative value thereof based upon the extent to which the facsimile exhibits the particular coin defect. The numeric values of the facsimile coins which exhibit the defects to the same extent (roughly) as a test coin are noted and summed to arrive at a total numeric value for the coin. The monetary value or grade of the test coin is then determined with reference to tables which correlate the total numeric value of the test coin to a monetary value.

Although it is claimed in Mason that the described apparatus allows for the "objective" evaluation of coins, a subjective interpretation of the various facsimile coin definitions and matching of a test coin to a particular definition is still required. Mason simply assists the appraiser by directing his attention to some of the individual factors which comprise the various grade levels. Further, Mason only provides for consideration of selected factors such as bag marks, and coin lustre, and does not address equally important considerations such as the location of the bag marks on the surface of the coin.

An issue closely related to coin grading involves the identification of lost or stolen coins. The importance of "fingerprinting" collectable coins for future identification is also of greater importance today as the value of such coins has increased. Presently, a coin is traced and identified via stored photographs of the coin, which are typically taken at the time the coin is graded. This procedure is sufficiently accurate, yet it is very time consuming to initially record the coins and then to subsequently search through a large number of coin photographs to identify a particular coin, much too time consuming to undertake with each coin being graded, at least not without first having a suspicion that a particular coin has been previously reported as lost or stolen.

An illumination system which can efficiently and economically provide different, controllable illumination of an object under study is not limited to use with an objective coin grading system of a type described herein and in the cross-referenced case. Rather, the systems, and accompanying surface evaluation methods, presented herein are applicable to many types of vision systems such as automatic measurement techniques for precision products ranging from mechanical parts made to very narrow tolerances to minute VLSI semiconductor products. In addition, such illumination systems and methods can be employed in microscopy, microphotometry, and microphotography, where the part being examined is viewed under some substantial magnification and image enhancement. Those skilled in the optics art will recognize further uses for the systems and methods described herein.

To summarize, there presently exists a genuine need for accurate surface illumination and evaluation techniques, for example, for use in a fully objective system for categorizing a coin at an appropriate grade level and for "fingerprinting" a coin for recordation and subsequent comparison with other coins.

SUMMARY OF THE INVENTION

Briefly described, one aspect of the present invention comprises a novel illumination system for applying light to an object's surface at varying angles of incidence, for example, to enhance features or defects on the object's surface. The system includes a light source which is positioned coaxial with the optical axis of a viewing means. The light source is spaced from and located relative to the target object such that direct light from the source is blocked from reaching the surface of the object. First reflecting means directs light from the source to a second reflecting means in a pattern substantially concentric with the optical axis. The second reflecting means, positioned in the path of the concentric light pattern reflected from the first reflecting means, directs light towards the surface of the target object. Lastly, the system has space varying means for adjusting the distance between the second reflecting means and the target object.

In an enhanced version, the system includes a light shield movable between a retracted position whereby none of the substantially concentric light pattern from the first reflecting means is blocked by the shield and an extended position wherein the shield is substantially coaxial with the light source and the target object such that a substantial portion of the concentric light pattern reflected from the first reflecting means is blocked from reaching the second reflecting means. The light shield has at least one opening therein sized to allow the passage of a beam of light therethrough. The beam of light passing through the shield is parallel to the optical axis and derived from the substantially concentric light pattern reflected from the first reflecting means. When extended, the light shield is substantially coaxial with the optical axis and rotatable thereabout such that the direction of the light being reflected from the second reflecting means relative to the object's surface is varied with rotation of the shield.

In another embodiment, the invention comprises a novel method for the evaluation of a object's surface for defects. The method includes the step of applying a substantially uniform beam of light to the surface of the target object, the beam of light being principally confined to certain defined angles of incidence relative to the object's surface. The confined angles include a perpendicular component angle of incidence range and a parallel component angle of incidence range relative to the object's surface. The perpendicular and parallel component ranges are defined such that the light beam applied illuminates the object's surface from a distinct direction relative to the object's surface. The method further includes: optically imaging the object's surface simultaneous with applying the uniform beam of light thereto varying the parallel component range of the angles of incidence relative to the object's surface while maintaining the perpendicular component range of the angles of light incidence substantially constant such that the direction of light beam illumination relative to the object's surface is rotated, and repeating the optical imaging step; repeating the parallel component range modifying step until the direction of light beam illumination has covered approximately 360° about the surface; and automatically identifying areas of Lustre Interruption Marks and High Angle Impact Marks on the object surface from the optical image produced at each rotation of the light beam illumination direction.

In further embodiments of the invention, the evaluating method includes creating a grey scale High Angle Impact Mark map from the areas of the object surface having varying intensity as the direction of light beam illumination is rotated, and creating a grey scale Lustre Interruption Mark map from the areas of the object surface images having substantially no light reflection in the direction of the imaging means as the direction of light beam illumination is rotated. In addition, where the target object comprises a coin, the method includes the step of optically mapping the raised contour features of the surface of the coin. This is accomplished by applying a confined, substantially uniform beam of light to the surface of the coin at a grazing incidence thereto. This applied light has a substantially 360° parallel component range. A coin feature map is then produced from the areas of light reflection and subtracted from the High Angle Impact Mark map and the Lustre Interruption Mark map to eliminate coin features which may have been inadvertently imaged into these maps. In a further embodiment, an objective method for the evaluation and quantification of surface lustre is also provided herein.

Accordingly, a principal object of the present invention is to provide an illumination system and evaluation method for accurately imaging features, defects, etc. on the surface of an object.

Another object of the present invention is to provide an illumination system capable of applying well-controlled beams of light at varying angles of incidence to the surface of an object.

Yet another object of the present invention is to provide such an illumination system which is capable of efficient illumination of an object's surface.

A further object of the present invention is to provide an illumination system and evaluation method capable of facilitating the objective, automated grading and/or fingerprinting of a coin.

A still further object of the present invention is to provide an evaluation method for accurately quantifying surface lustre of an object.

BRIEF DESCRIPTION OF THE DRAWINGS

These and other objects, advantages and features of the present invention will be more readily understood from the following detailed description, when considered in conjunction with the accompanying drawings in which.

DETAILED DESCRIPTION OF THE INVENTION

Figure 1A:
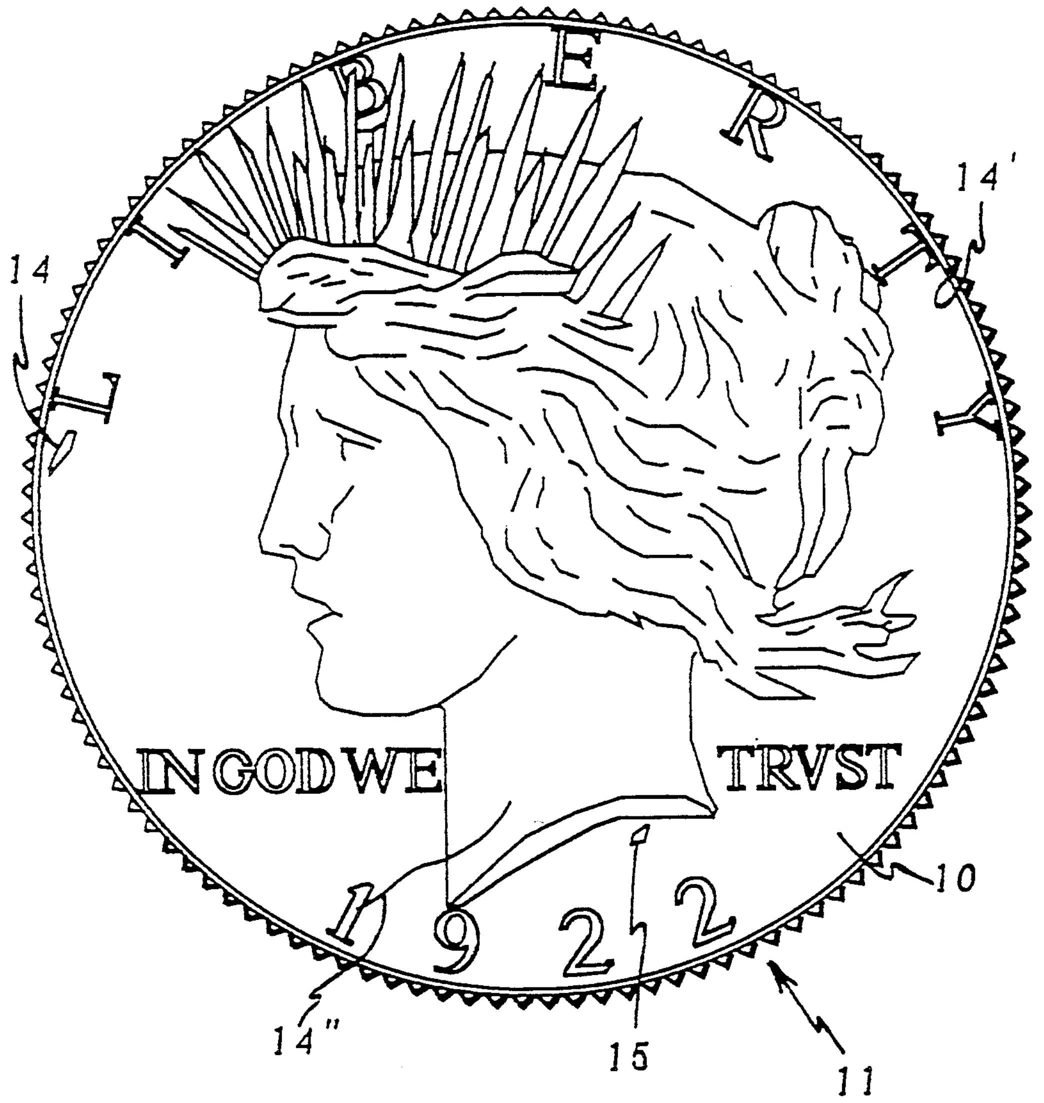
FIG. 1A is a representation of the obverse side of a specimen coin to be graded.

The cross-referenced application, the entirety of which is hereby incorporated herein by reference, describes a system and method for objectively assigning a numismatic grade to a coin ("test coin"), and for objectively and accurately fingerprinting the coin for purposes of identification, e.g., through comparison of said coin fingerprint with fingerprints previously recorded for coins of the same issue. Central to the objective method described therein, is the exact, numerical evaluation of various coin characteristics or features. Image analysis of optical coin images is believed a preferable technique for such an evaluation. The present invention adds to this disclosure by providing novel illumination and evaluation systems and methods which facilitate implementation of the processing described in the related case.

Briefly described, the test coin characteristic most important to objective grading and fingerprinting pursuant to the invention set forth in the incorporated case is the presence of detracting marks on either, or both, of the obverse and reverse surfaces of the coin. Specifically, each detracting mark on the coin is identified, located and measured. An "assigned quantity" representative of the detracting significance of each mark is calculated by adjusting the measured surface area of the mark by a factor representative of the relative grading importance of the particular area of the coin where the mark is located. Surface area measurements and locating of detracting marks are preferably determined to fairly exact standards or units (discussed further herein). Because of the exactness of the measurements, an accurate "fingerprint" of the coin is provided by the surface area and location information for the detracting marks on each coin surface. The identifying function is accomplished by comparing the test coin's fingerprint with a preexisting database of coin identifying information comprising fingerprints of all previously recorded coins of the same issue. When a match is found, an indication is provided that the coin has been previously fingerprinted, and if pertinent, that the coin has been flagged as lost or stolen.

The objective grading aspect of the incorporated case further requires that detracting mark assigned quantities for each coin surface be separately summed and correlated to a grade by comparison with a preexisting database of values representative of numismatic grades. A preferred method for generating this database of values is described therein.

In addition to evaluating or grading the test coin based upon the presence of detracting marks, an analysis of each coin surface is preferably undertaken to determine a mint lustre value and strength of strike value, etc. Each of these evaluations, which are described further herein, again relies upon quantification of the specific characteristic under consideration and comparison of the test coin measurement(s) with preexisting databases of such information.

The coin grading and identification concepts described, i.e., based on converting various features of the coin into measured data for analysis, are applicable to all qualities of coins, both circulated and uncirculated. However, because of the wider popularity and value associated with uncirculated or mint state coins, the discussion presented herein is essentially based upon the uncirculated grade categories, i.e. MS60 through MS70.

Figure 1B:
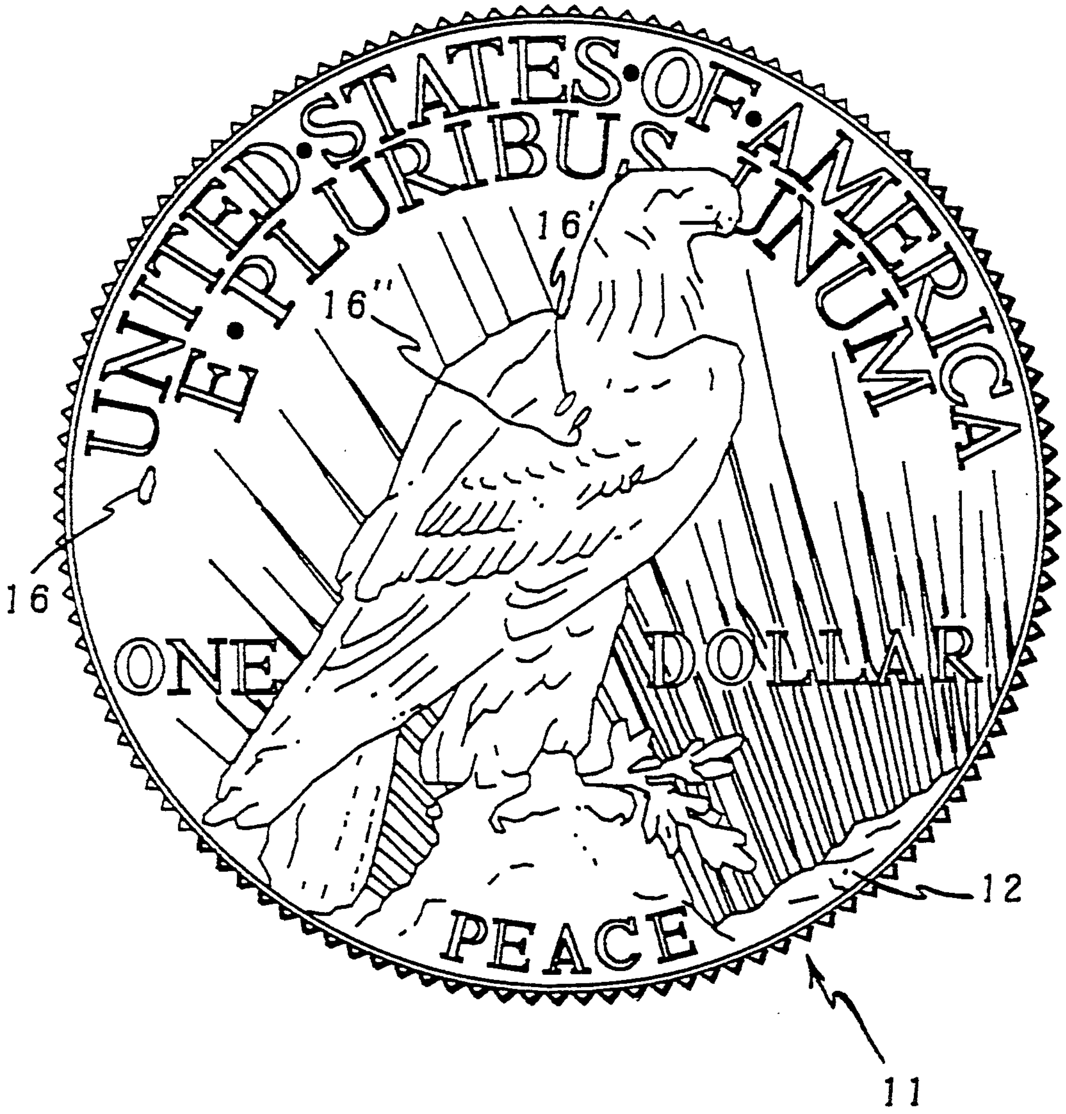
FIG. 1B is a representation of the reverse side of a specimen coin to be graded.

FIGS. 1A and 1B show the obverse 10 and reverse 12 surfaces, respectively, of a sample test coin 11 to be objectively graded and fingerprinted. Test coin 11 is a representation of a 1922 Peace Dollar which is marred by several detracting marks 14, 14', 14'' and 16, 16', 16'' on the obverse 10 and reverse 12 surfaces, respectively, of the coin. Mark 15 on obverse surface 10 of coin 11 represents the coin designer's signature and is therefore not a detracting mark. (Any mark defined at the time of minting is not considered a detracting mark.)

Figure 2:
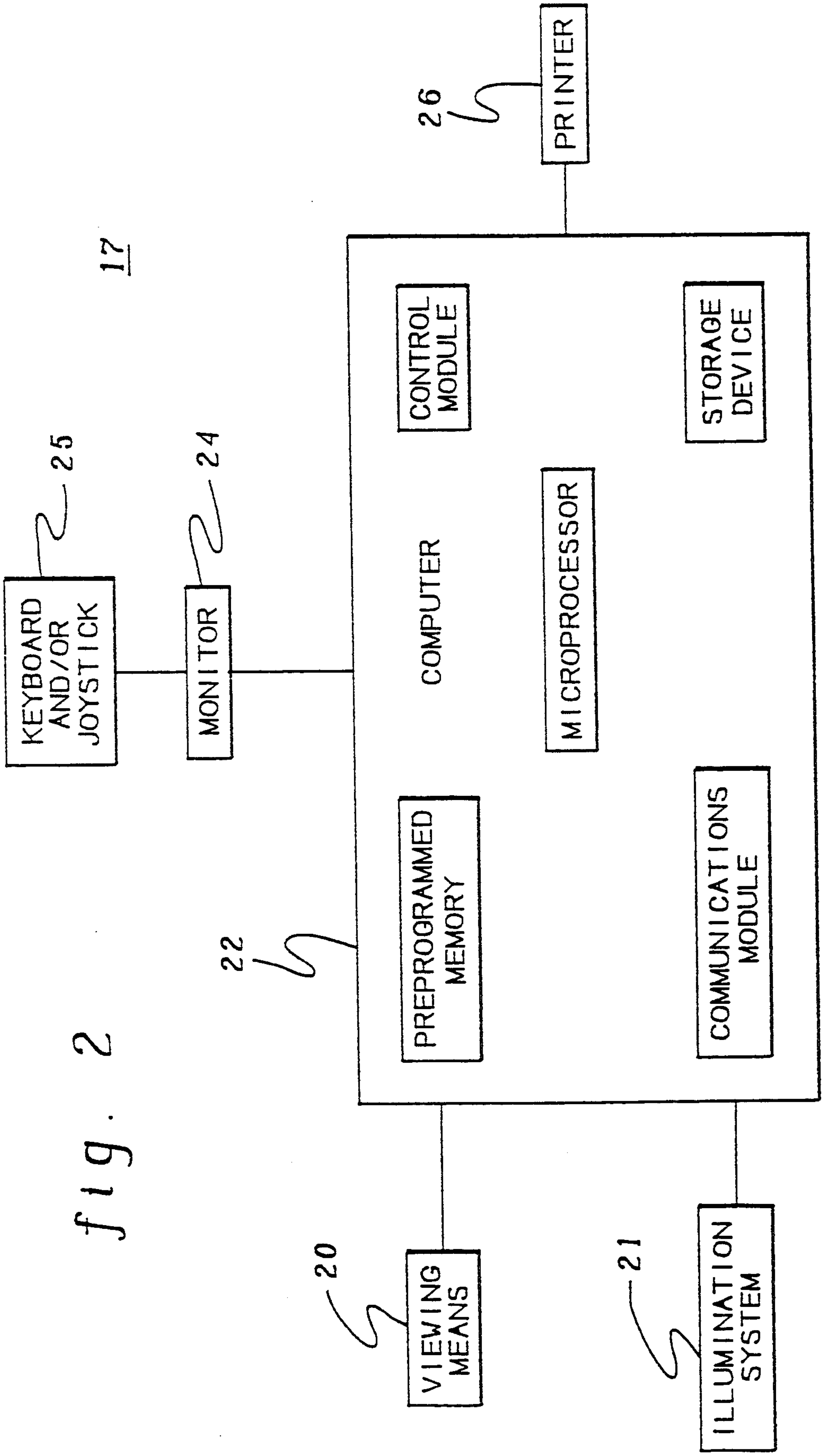
FIG. 2 is a block diagram representation of one preferred image analysis system useful in implementing the present invention.

As noted above, image analysis is preferably utilized to objectively grade coin 11. A block diagram representation of such an image analysis system 17 is shown in FIG. 2. System 17 includes a viewing means 20 for forming an optical image of the surface of either the obverse or reverse surface of coin 11 and an illumination system 21 which cooperates with viewing means 20 and a computer 22 to properly illuminate the coin surface under evaluation. Computer 22, which controls illumination system 21, includes a microprocessor, preprogrammed memory, control and communication modules, and storage device. If desired, signals from viewing means 20 can be simultaneously fed to a monitor 24 for operator viewing. If so, a keyboard and/or joy stick 25 is preferably included to allow interaction between system 17 and the operator. A hard copy printout of the grading and/or identification results can be provided via a printer 26.

One such image analysis system 17 useful for implementation of the present invention is manufactured by Tracor Northern of Middleton, Wis., and commercially sold under the name "TN-8500 Image Analysis System." As noted in the incorporated case, it will be apparent to those skilled in the art from the following discussion that other types of the imaging hardware and/or systems may be utilized in implementing the invention. For example, scanning electron microscopes, energy dispersive spectrophotometers, VCRs, laser scanners, holography, interferometry and image subtraction are a few of the alternate, presently available types of equipment technologies which may be used.

More detailed descriptions of the grading and fingerprinting systems and methods summarized herein are presented in the incorporated case.

In a first important aspect, the invention described herein comprises a novel illumination system for optimizing automated optical extraction of coin features, detracting marks, lustre, strength of strike, etc., for example, using system 17. In a second important aspect, this invention presents a general approach for automated optical evaluation of a coin surface. As noted initially, however, both the illumination systems and evaluation methods of the present invention are applicable to illuminating and evaluating any object surface wherein structured and easily controllable light is desired for image and feature enhancement for automated inspection thereof. The claims appended hereto are intended to encompass all such uses.

Figure 3:
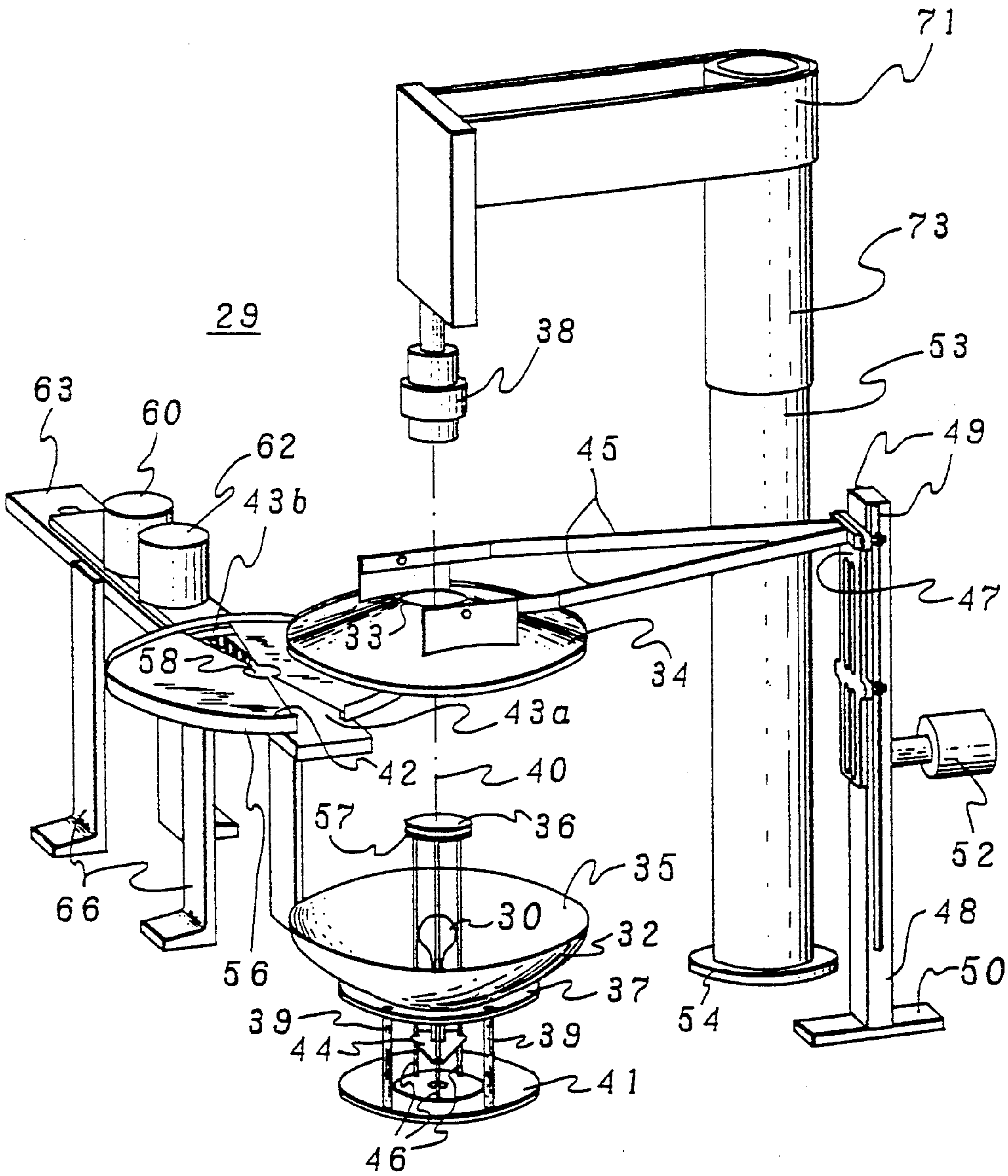
FIG. 3 is a perspective illustration of one embodiment of the illumination system of the present invention with its main components shown in their home position.

One embodiment of an illumination system, generally denoted 29, of the present invention is shown in perspective view in FIG. 3. System 29 includes, in part, a light source 30, a first reflector 32, a second reflector 34 and a specimen table 36. Second reflector 34 has a central opening 33 through which an imaging camera 38 views an object (not shown) positioned on table 36. In the embodiment shown, light source 30, first reflector 32, second reflector 34, light table 36 and camera 38 are coaxial and are aligned with an axis which coincides with optical axis 40 shown in phantom between camera 38 and table 36. Another major component of illumination system 29 is a light shield 42. As explained further below, second reflector 34 and light shield 42 are shown in their "home" position in FIG. 3.

Light source 30 is located at the focus of reflector 32, which preferably comprises a paraboloidal reflector. Source 30, which is vertically adjustable, is mounted on a triangular plate 44 with three holes as its vertices to accommodate table 36 supporting rods 46. Plate 44 is secured to rods 46 via set screws (not shown) inserted through threaded holes (not shown) in the edge of plate 44. Those skilled in the art will recognize that an automated scheme could be substituted for this manually adjustable plate 44. Either source 30 or reflector 32 should be adjustable to facilitate locating of the light source approximately at the focus of the reflector. The intensity of light emitted from source 30 is preferably controlled by a computer controlled rheostat (not shown) in the power line to the light source.

Although any reflective shape may be used to implement reflector 32, including a flat reflective sheet, a paraboloid is believed to offer optimum reflective properties for the present invention. Paraboloidal reflector 32 has a mirror-like inner surface 35 to facilitate reflection of light from source 30 to reflector 34. Reflector 32 rests on a mounting ring 37 that is supported by three threaded rods 39 which are attached to a base plate 41. Light is directed from reflector 32 towards reflector 34 in a pattern that is substantially concentric with the optical axis 40. Further, the reflected rays are preferably collimated by the paraboloidal reflector.

Second reflector 34, again which could comprise any reflective shape, is preferably a conical-shaped reflector having a matte inner surface (not shown). A matte surface allows reflector 34 to direct a substantially uniform, dispersed light to an exposed surface of an object located on table 36. In one embodiment, reflector 34 is molded from plastic. As shown, second reflector 34 is affixed to an arm 45 which is mounted to a rack and pinion driven plate 47. Plate 47 traverses rails 49 on either side of post 48. Post 48 is bolted to a base plate 50. A stepper motor 52 is mounted on post 48 to drive the pinion (not shown) that drives plate 47 along rails 49. The pinion may be meshed onto the rack by means of an eccentric to adjust contact pressure. Software and/or limit switches are provided to ensure that plate 47 remains within a defined range. Thus, this assembly provides the automated ability to adjust the distance between reflector 34 and table 36, and therefore between reflector 34 and an object positioned on table 36, which is important to the present invention as emphasized further herein.

Three cylindrical rods 46, threaded at both ends, are used to mount table 36 to base plate 41. The threaded rods pass through appropriately sized holes in first reflector 32 and are threaded at each end into table 36 and plate 41. Note that table 36 is intentionally positioned and sized to prevent light from source 30 from directly reaching second reflector 34 or an object placed on the supporting surface of table 36.

Camera 38 may comprise any appropriate optical imaging device such as a conventional black/white video camera. Camera 38 is mounted on an arm 71 attached to a movable sleeve 73. The movable sleeve is locked in position by two set screws to a post 53 which is secured to a base plate 54. Preferably, the movable sleeve will have two degrees of freedom; i.e., translational and rotational movement about the Z axis which is parallel to the axis of post 53. Once a desired position is obtained, the sleeve may be manually fixed to the post via the two set screws. Alternatively, a rack and pinion assembly may be added for motorized motion. In addition, the magnification at which an object is inspected can be changed by either physically moving the camera as described and refocusing the lens or by use of a motorized zoom lens. Further, an X-Y stage can be used as an object holder if the application requires that measurement be done only at the center of the image plane to prevent peripheral distortion arising cut of perspective geometry, or if the object is larger than the imaging device's field of view.

Figure 4:
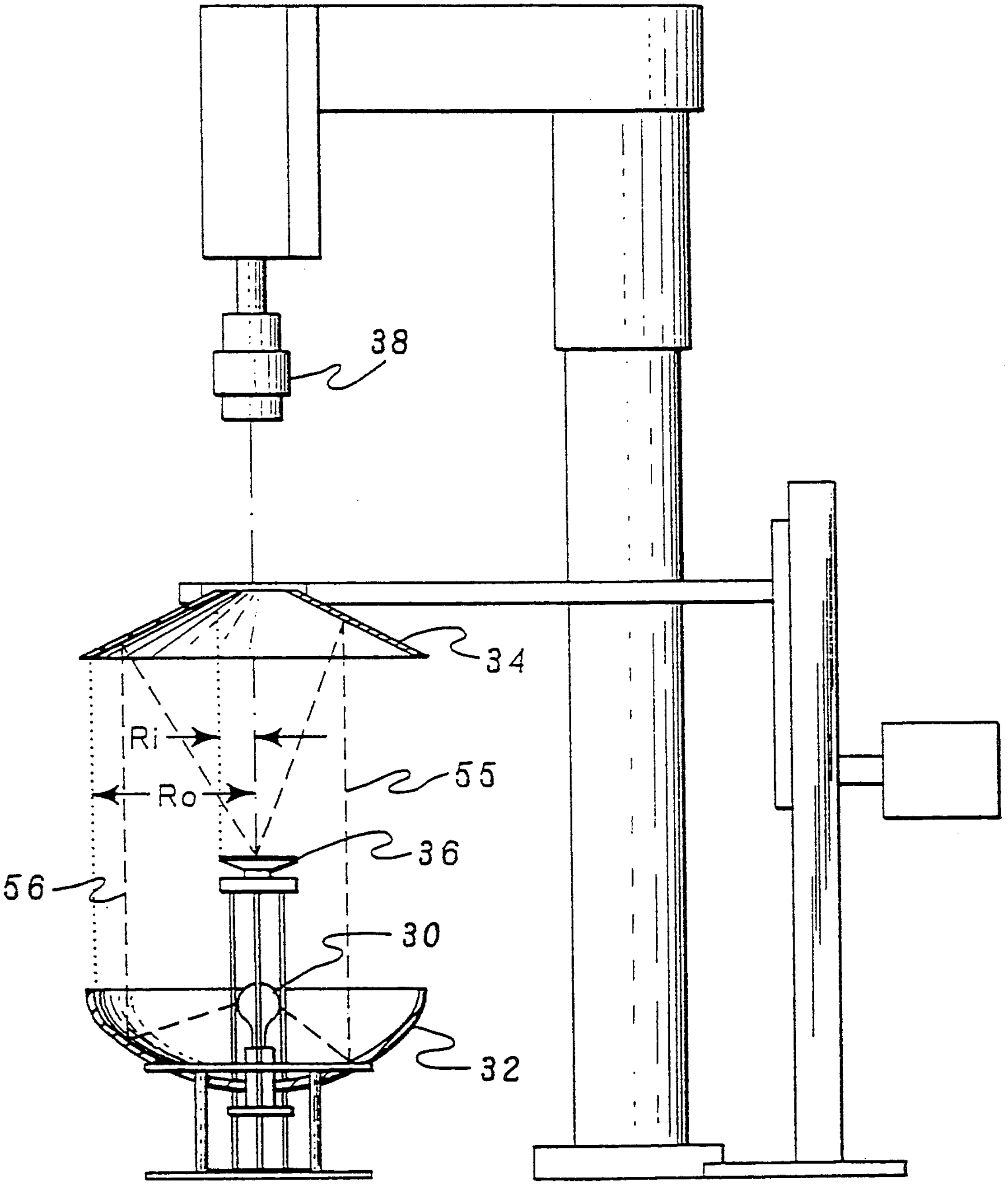
FIG. 4 is a partial, cross-sectional elevational view of the main components of the system of FIG. 3.

A cross-sectional elevational view of certain system 29 components, including light source 30, first reflector 32, second reflector 34, table 36 and camera 38, is depicted in FIG. 4. As can be understood from FIGS. 3 and 4, an annular ring of collimated light from source 30 is reflected from first reflector 32 to second reflector 34 The annular ring of reflected light comprises a beam which includes a multitude of individual rays, such as rays 55 and 56 depicted by way of example. The annular ring of collimated light from reflector 32 to reflector 34 has an outer radius "$R_o$" and an inner radius "$R_L$". The annular beam of light striking reflector 34 results in light being reflected therefrom back down to table 36 such that each point or pixel of an imaged object on the table "sees" only light traveling through a cone whose apex is the pixel and whose base is the outer diameter of reflector 34. The angle of the incident cone of light may be controlled by moving reflector 34 along its axis via the computer controlled stepper motor. If the solid angle of the cone of light from reflector 34 to table 36 is to be increased, then reflector 34 is moved towards table 36 and if the angle is to be decreased, the reflector is moved away from table 36. Thus, the direction of incident light in the plane perpendicular to the surface of a coin positioned on table 36 (i.e., its perpendicular angle of incidence) is varied by changing the distance between reflector 34 and table 36. In the limiting cases, grazing and normal light incidence are achieved. System 29 can control the direction of incident light in the plane parallel to table 36 (i.e., its parallel angle cf incidence) via light shield 42 as described further below.

Figure 5:
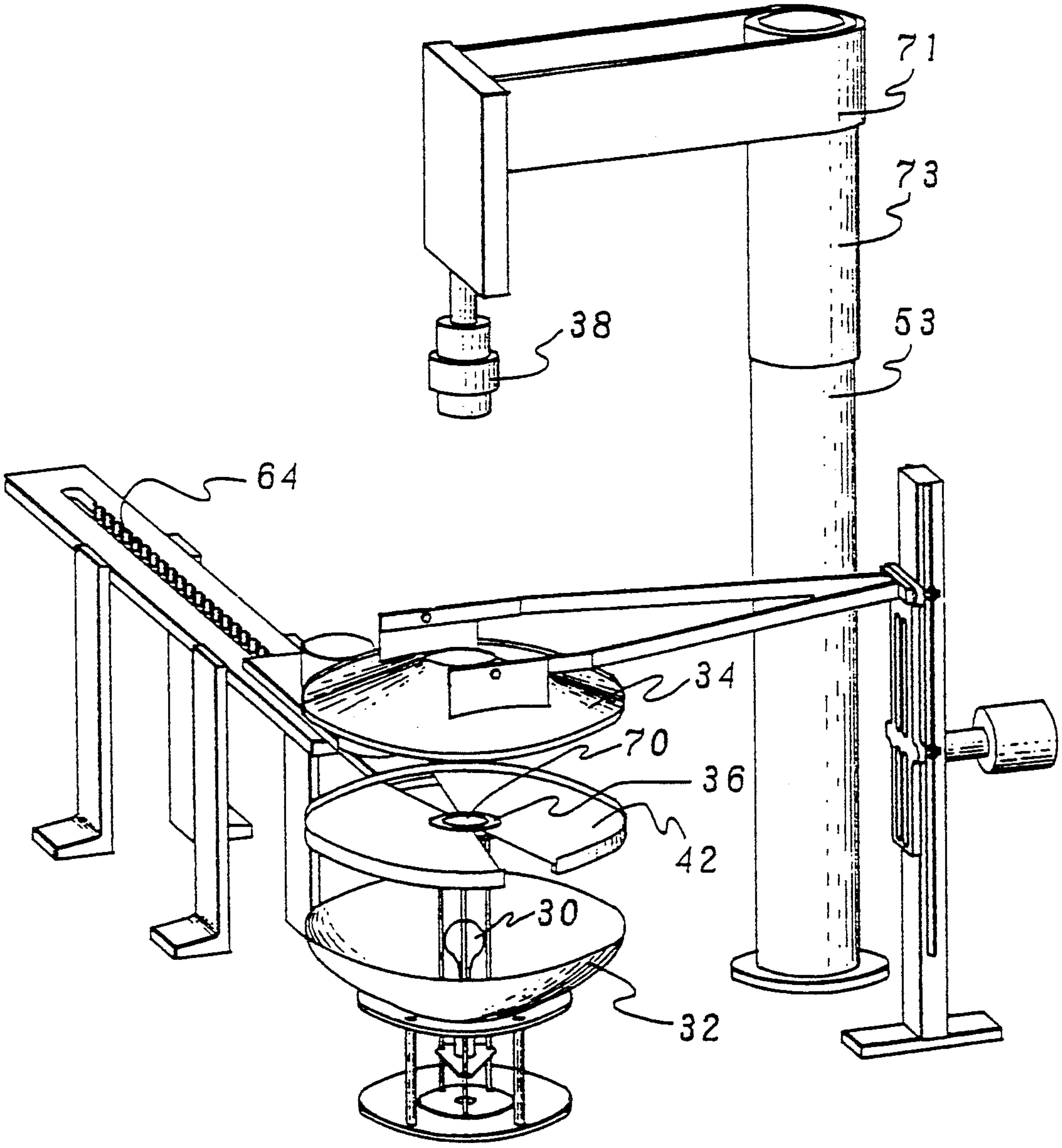
FIG. 5 is a perspective illustration of the system of FIG. 3 with the light shield extended and the second reflecting means lowered to an intermediate position.

Referring now to FIGS. 3 and 5, light shield 42 is shown in its "home" or retracted position in FIG. 3 and in its extended position in FIG. 5. When extended, light shield 42 is substantially coaxial with source 30, first and second reflectors 32 and 34, table 36 and camera 38. In the embodiment shown, shield 42 includes two 30° angular openings **43*a* and 43*b* positioned diametrically opposite each other. Shield 42 is supported at its circumference by a circular rim 56. Opening 43*a* extends through rim 56 such that when extended, shield 42 may slide into a slot 57 in table 36. A center opening 58 is also provided in shield 42 to allow the light shield to extend about table 36 and rotate freely within table groove 57**.

Light shield 42 has two degrees of freedom. A prismatic drive 60 enables the controller to extend shield 42 about table 36 and a revolute drive 62 allows shield 42 to rotate about its own axis. The shield and its drives are mounted on an elongate bar 63 which also accommodates a rack mount assembly 64 within which a pinion (not shown) is driven by stepper motor 60. Bar 63 is supported by four legs 66. Automated rotational adjustment of shield 42 can be accomplished in a number of ways. In one embodiment, a groove (not shown) is provided in the outer surface of support ring 56 within which a chain (not shown) is placed. The chain is secured to the ring at opposite ends of opening **43*a*, and is geared to a drive such as stepper motor 62. As the stepper motor rotates the drive gear, it pulls the chain and since the chain is fixed at its ends it rotates outer support ring 56 and thereby shield 42**.

Figure 6:
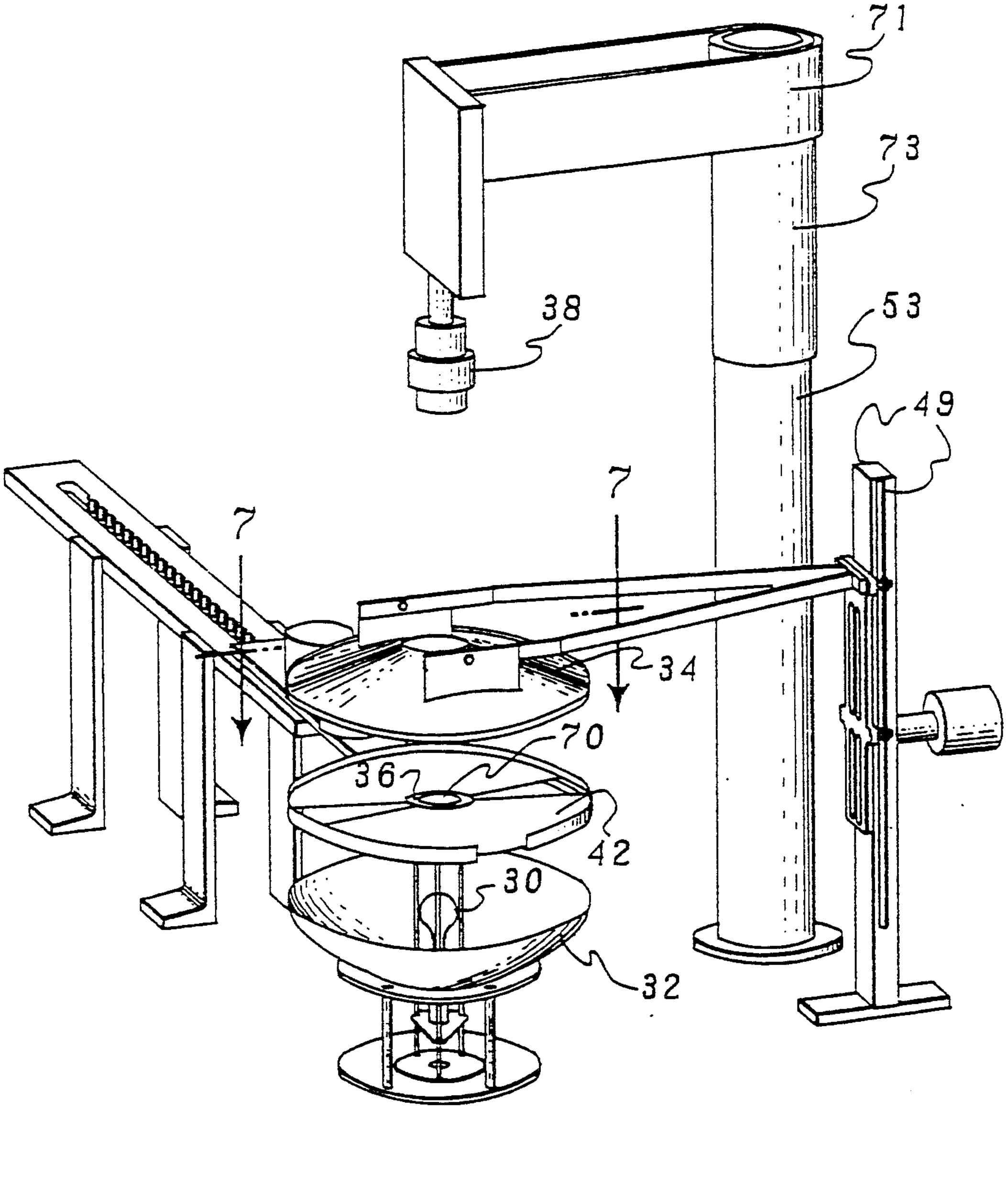
FIG. 6 is a perspective illustration of the system of FIG. 5 shown with the light shield rotated substantially 90°.
Figure 7:
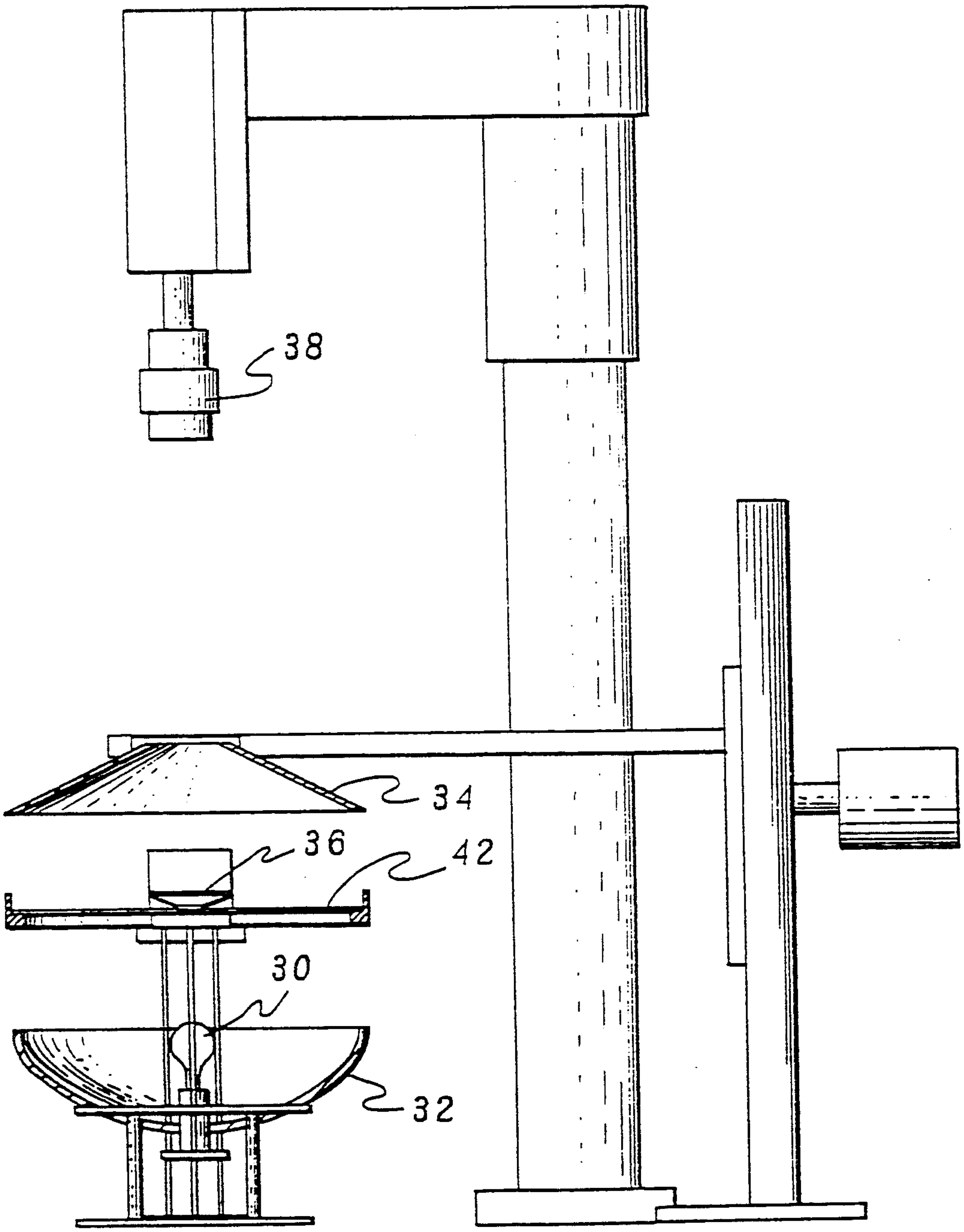
FIG. 7 is a partial, cross-sectional elevational view of the main components of the system depicted in FIG. 6.

System 29 controls the direction of incident light in the plane parallel to the coin surface via shield 42, and more particularly, the position of its radial openings **43*a* and 43*b*. The specific range of directions from which light is incident to the coin surface in the plane parallel to the coin surface is controlled by the location, shape and size of these openings in the light shield. When shield 42 is extended to lie coaxial with the other components of system 29, only two sections or arcs of the annular beam of light from first reflector 32 pass through the shield and reach second reflector 34. Since two 30° openings 43***a* and 43*b* are provided in shield 42, six rotations of shield 42 are required to illuminate the surface of a coin 70 positioned on table 36 from every direction about the coin in a sequential manner. If the arc size is different or if only one arc is provided in shield 42 then the number of rotations to attain 360° illumination about coin 70 would obviously vary. Also, light shield 42 could conceivably have three or more equally spaced openings in place of the two diametrically opposed openings that are depicted. The effectiveness of the illumination system, and, in particular, the function of the light shield, deteriorates with an increase in the number of openings therein. Light shield 42 is shown in perspective view in FIG. 6 after its third rotation from the initial extended position of FIG. 5. In FIGS. 5–7, second reflector 34 is shown in an intermediate position between its home position and a low vertical component angle of incidence position, i.e., a substantially grazing incidence light position. As described further below, the imaging for the High Angle Impact Mark map, Lustre Interruption Mark map and Lustre map are obtained at this intermediate level of the conical reflector (e.g., 8–10 inches from coin surface).

An alternative method for controlling the solid angle of light from second reflector 34 to table 36 is to vary the size of the conical reflector. Moreover, the type of reflected light can be controlled by using different types of reflective surfaces on the inner surface of the conical reflector. For example, if a specular or mirror-like surface is used, the reflected light will be tightly focused at one point on the surface of the object under evaluation. Further, the quality of light may be varied by using different types of light source (e.g., halogen, florescent, etc.).

The purpose of light shield 42 is to improve signal discrimination. A High Angle Impact Mark creates areas of disturbed metal whose surfaces are randomly orientated in the horizontal and vertical planes. If an object, such as a coin, is illuminated from a vertical angle and from 360° about its circumference, then many of these defective surface marks reflect light directly into the camera lens. Of course, areas adjacent to the HAIM will also reflect light into the lens and the mark may be lost in the general grey level. In a lustrous coin, this effect is even worse because of the many tiny facets created by the die marks. These facets are quite specular and if the coin is evenly illuminated from all directions, then some will reflect light into the camera lens, drowning out the signal from adjacent High Angle Impact Marks.

The function of the light shield, therefore, is to confine the incident light in the horizontal plane into a beam. If the beam of light strikes perpendicular to the die mark, the mark will reflect light into the lens so the image appears bright. If the beam strikes parallel to the die marks, the image will appear dark. Since the reflective surfaces of the High Angle Impact Marks are not generally parallel to the die marks, a HAIM will be imaged as a very bright spot in a dark background. Thus the light shield improves the ability to discriminate HAIMs from die marks.

If lustre is low or nonexistent on the coin surface, the light shield still helps because the general surface of the coin has some scattering coefficient whereby some light is scattered into the camera lens if the coin is illuminated. The strength of the scattering and the apparent brightness of the coin surface are proportional to the amount of light striking the surface. The direction of incoming light is inconsequential. By comparison, the surface of a dig (HAIM) is specular and will only reflect light into the lens when the light is perpendicular to the surface. Thus, by using a light shield, such as that described herein, to form six separate images of the coin, the signal to noise ratio is increased by a factor of six. In each image, the apparent brightness of the surrounding area is reduced six times. In five images, the HAIM will be invisible, but in the sixth image the mark will be very bright against a much reduced background.

The light shield also improves signal to noise discrimination for Lustre Interruption Marks. As defined initially, the LIM is a scruff or a scraped area parallel to the coin surface. When optically imaged, these specular surfaces appear black. A LIM may be very light, however, and difficult to distinguish from the rest of the coin surface. Because of lustre, undisturbed areas of the coin will appear very bright on at least one rotation of the light shield. On this rotation, the LIM becomes clearly apparent as a dark area in a bright background, thereby significantly improving signal discrimination.

As noted above, illumination system 29 can be used in any automated inspection system using optical imaging devices in addition to the computerized grading systems and method of the present invention. In one mode, the illumination system illuminates the planar surface uniformly with a solid cone of light. The angle of the apex of the cone is controllable and using the light shield it is possible to restrict the incident light to only a segment of the cone instead of the complete 360° direction of illumination about the object's surface. The angle subtended by the segment and the solid angle of the cone is software controllable. The solid angle of the cone of light illuminating the object's surface can be varied from an almost grazing perpendicular angle of incidence component range to an almost normal perpendicular angle of incidence component range by moving the conical reflector down and up. If less than a full 360° solid angle of illumination is desired, then the light shield is used to segment out a section of the collimated beam from the first reflector for travel to the second reflector and hence the object's surface. The direction of this light segment is controlled by the shape, size and location of the opening in the light shield. The direction of light segment in the plane parallel to the coin surface can be varied by rotating the light shield.

Certain detailed illumination and surface evaluation methods using the system described above will now be presented. In the process examples set forth below it is assumed that a lustrous untoned coin surface is to be illuminated and evaluated. Those skilled in the art, however, will recognize that identical and/or analogous processing steps can be utilized for illuminating and evaluating proof coins, both toned and untoned, and toned lustrous coins (discussed further below), as well as other types of object surfaces.

Figure 8:
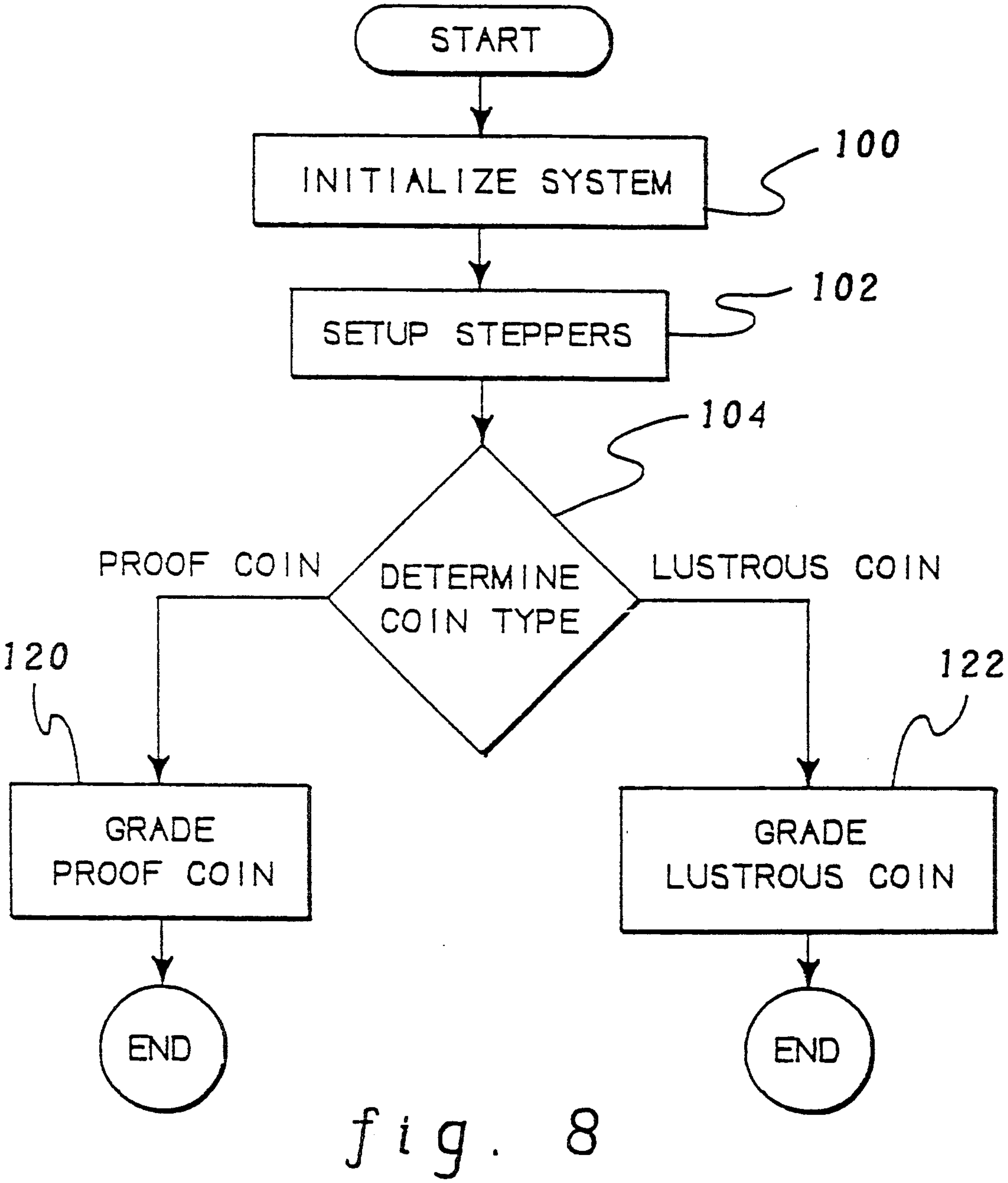
FIG. 8 is a flow diagram of one method of beginning the evaluation process of the present invention.

Referring now to FIG. 8, the processor begins one embodiment of the illumination and evaluation techniques of the present invention by initializing system components, 100 "Initialize System." Included within this step are: (1) calibrating the camera against a set of known grey scales; (2) focusing the camera; (3) coaxially aligning the parabolic reflector, conical reflector, light source, specimen table, and the optical axis of the camera; and (4) clearing grey scale and binary image memories and setting initial pixel values to (0).

Figure 9:
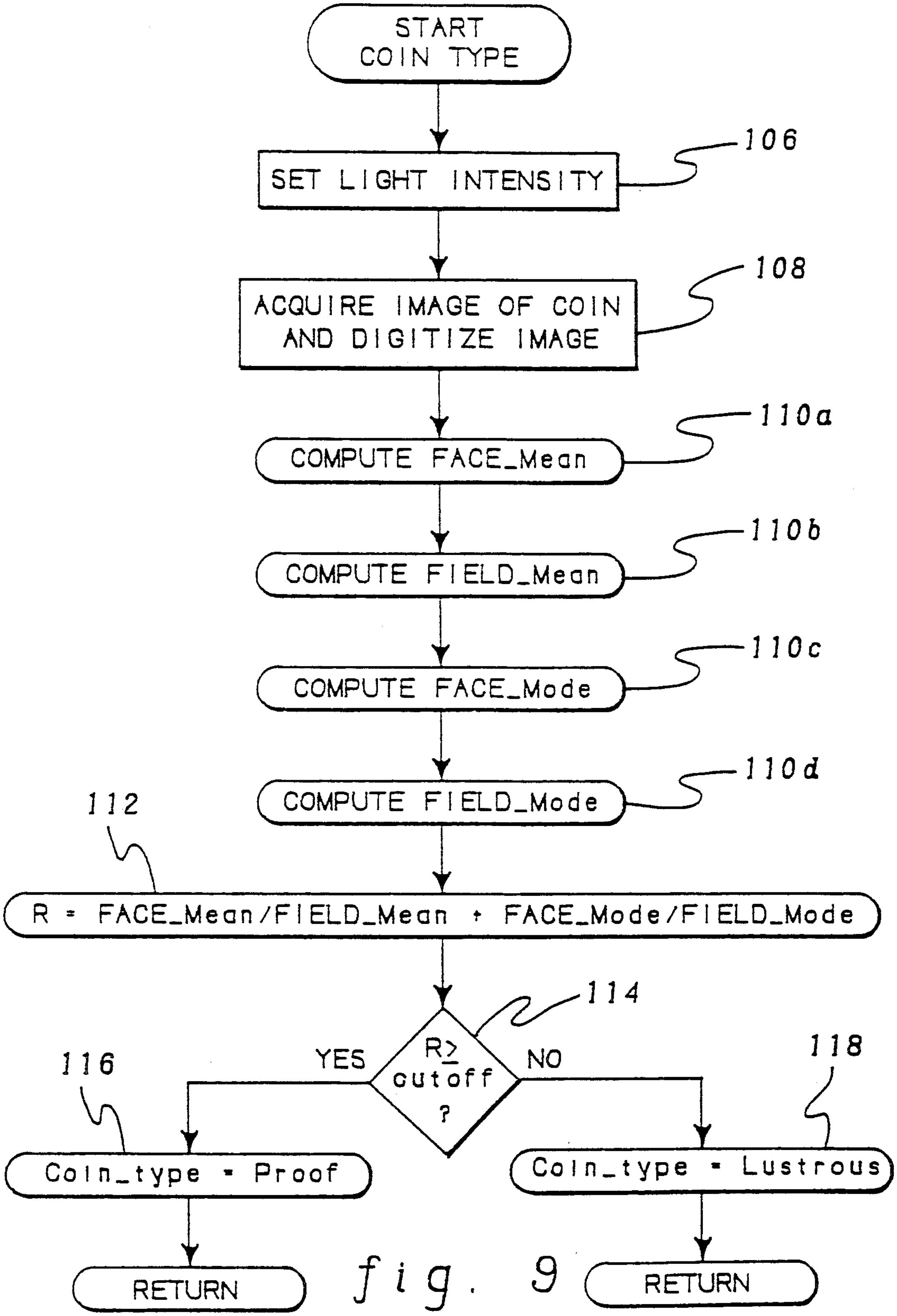
FIG. 9 is a flow diagram of a coin type determining method used in the present invention.

After initializing system components, the processor initializes the stepper motor controllers, 102 "Setup Steppers." As noted above, the stepper motors drive vertical movement of the conical reflector and lateral and rotary movement of the light shield. If necessary, programs to control each stepper are downloaded at this stage. The initial positions or "home" positions are defined for each stepper motor. The home position of the conical reflector is defined as its most distant position relative to the coin table, e.g., approximately 20″. The home position of the light shield is defined as its retracted position with the open end of the first slot normal to the common axis of all components. After system components and controllers have been initialized, the processor determines whether the coin under evaluation comprises a lustrous coin or a proof coin, 104 "Determine Coin Type." The automated procedures for grading these two types of coins are not identical because the optical properties of a lustrous coin surface and a proof coin surface differ. One such procedure for determining the coin surface type is set forth in FIG. 9.

To start coin type evaluation, the processor sets the light source intensity, 106 "Set Light Intensity." Light intensity is set by a voltage controlled rheostat. In one embodiment, voltage to the rheostat has one of 4,000 values between 0 and 10 volts, thereby being controllable to 0.0025 volts. The processor controls the rheostat via an appropriate analog output line. Thus, the computer can change the intensity of the light source by changing the input voltage to the voltage controlled rheostat. Therefore, the first step in the coin type determination process is to set the light source intensity to a constant, predetermined value by setting the input to the rheostat.

After setting light intensity, the processor acquires an image of the coin surface, 108 "Acquire Image of Coin and Digitize Image." In addition to acquiring the coin image, the image processor takes the output of the camera and digitizes it, e.g., into a 512×480 image array, and stores this grey image in memory for subsequent processing. The next four blocks of FIG. 9, **110*a*–110*d* "Compute Face_Mean," "Compute Field_Mean," "Compute Face_Mode," and "Compute Field_Mode," direct the processor to compute the face_mean, face_mode, field_mean and field_mode of the coin surface. In this example, the coin surface is segmented into four different areas, i.e., the face, field, hair and letters. These segmented regions are stored as binary templates in image memory. (See, for example, FIGS. 15A–15D** for templates of a Morgan silver dollar.) These values are defined by equations (1)-(4) as follows:

$$\text{Face\_Mean} = (\Sigma \text{ intensity of pixels in face zone})/(\text{number of pixels in face zone}) \quad (1)$$

$$\text{Field\_Mean} = (\Sigma \text{ intensity of pixels in field zone})/(\text{number of pixels in field zone}) \quad (2)$$

$$\text{Face\_Mode} = (\text{intensity at which highest number of pixels in face zone are located}) \quad (3)$$

$$\text{Field\_Mode} = (\text{intensity at which highest number of pixels in field zone located}). \quad (4)$$

Applicants have discovered that for proof-like coins the grey level statistics in the field are significantly different from the grey levels statistics in the face. The field is usually mirror-like. Thus, the mean and mode of field pixel intensities are much lower than the mean and mode of face pixel intensities. Conversely, for a normal lustrous coin surface the statistics are approximately equal. This discovery is used to differentiate between a lustrous coin type and a proof coin type. The statistics are computed using equations (1)-(4) and the appropriate field and face templates, which are stored as grey scale images, for the coin type under evaluation.

Figure 10:
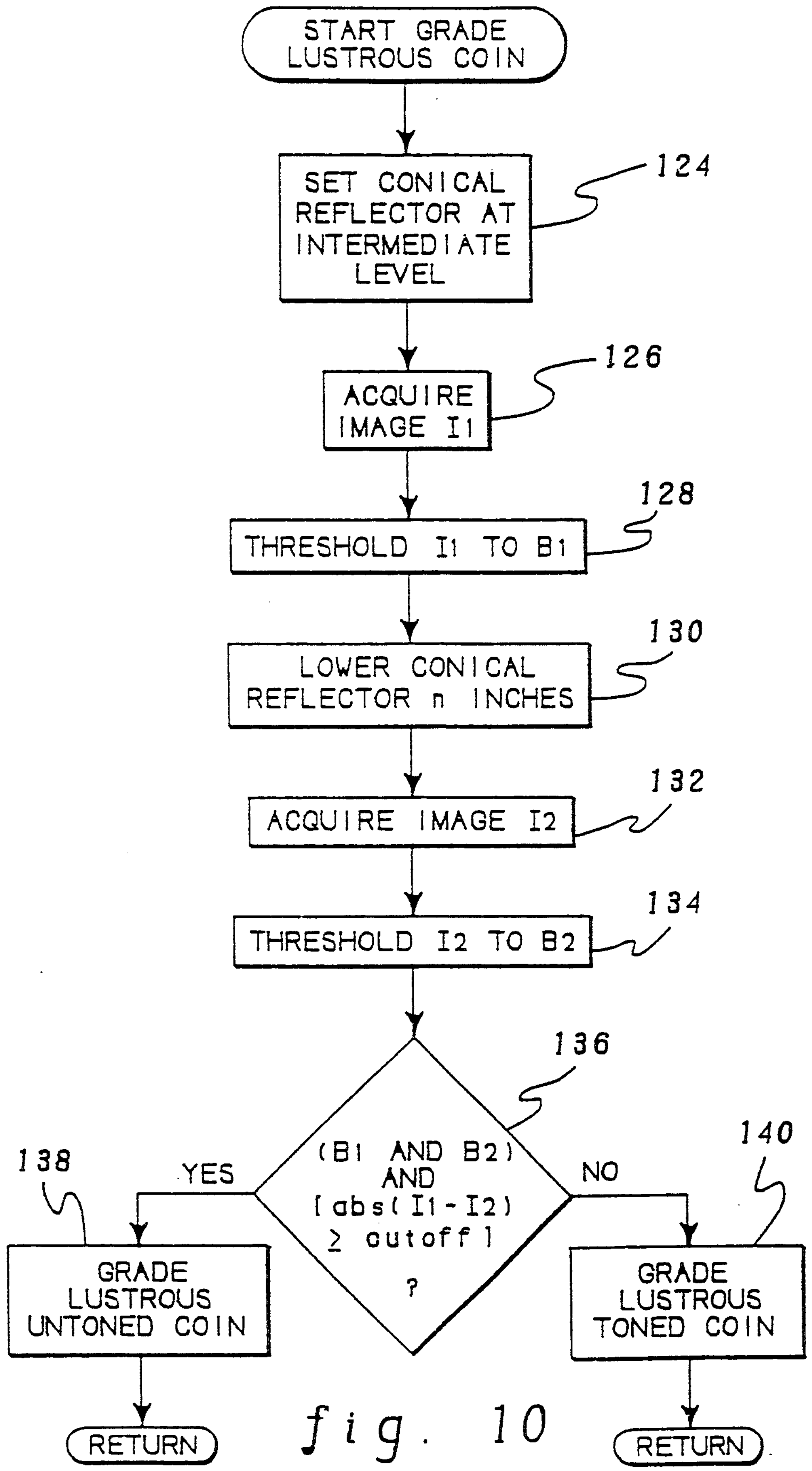
FIG. 10 is a flow diagram of a toning determination method used in the present invention.

Next, the ratios of the calculated face_mean, field_mean, face_mode and field_mode are summed and assigned to a variable R, 112 "R=Face_Mean/Field_Mean+Face_Mode/Field_Mode." The processor then determines whether the variable R is greater than or equal to a predefined cutoff value, 114 "R≧cutoff?" If the coin is a proof-like coin, both ratios definitive of variable R are greater than 1 since the face is brighter than the field. Thus, if R is greater than a predetermined cutoff value then the coin is classified as a proof-like coin and flow is to instruction 116 "Coin_Type=Proof." Otherwise, the processor is directed to instruction 118 "Coin_Type=Lustrous." After the coin has been classified as either a proof-like coin or a lustrous coin the processor returns to the routine of FIG. 8 at instruction 120 "Grade Proof Coin" or 122 "Grade Lustrous Coin," depending upon the determination made at inquiry 104. One initial procedure for grading a lustrous coin is depicted in FIG. 10. (Again, grading of a proof coin involves analogous steps.)

The flowchart of FIG. 10 explains a procedure to discriminate between "toned" lustrous coins and "untoned" lustrous coins. Toning is the coloration of a coin due to formation of sulfide or other chemical layers on the coin surface. Depending upon the chemistry and thickness of the deposited layer at the toned areas, the coin surface may acquire different colors. In order to optically evaluate detracting marks on such a coin surface, especially LIM's, it is important that toning be identified and compensated for if present. In addition, location and severity of the toning must be known. The approach taken herein is to define a cutoff for the degree of toning. If the toning is greater than the cutoff then a different incident light scheme is used to image through the toned region. Elsewhere on the coin surface the same procedure that is used for untoned lustrous coins is implemented. Applicants' procedure determines the degree of toning based on the observation that LIMs are very sensitive to change in intensity and to change in the angle of incidence of a beam of incident light, while toned regions are not very sensitive to these changes. Thus, by varying the intensity and the angle of incidence of the light beam, the LIMs will change size and average intensity to a greater extent than areas of the coin that have a high degree of toning.

Initially, the processor is directed to set the conical reflector at an intermediate level, 124 "Set Conical Reflector at Intermediate Level." For example, a distance of 10″ from the coin surface is acceptable for most coins. After setting the conical reflector, the processor acquires a grey scale image of the coin surface, 126 "Acquire Image I1," and then thresholds this image I1 to a binary image B1. Thresholding is a well known image processing operation in which a binary image is created to replace the pixel intensities of a grey scale image. In intensity based thresholding, pixels that are within a certain band of intensities are assigned (1) in the binary image and pixels that are outside the band of intensities are assigned (0). This operation can be explained as follows:

If I(Row, Col) ≧ threshold value
Then: B(Row, Col) = 1
Else B(Row, Col) = 0

Thus, the thresholding operation directs the processor to transform the grey scale image I into a binary image B. The pixels that have intensity greater than or equal to the threshold value are assigned (1) and all other pixels are assigned (0). A black/white imaging system with 8 bit A/D usually has 256 grey levels ranging from black=0 to white=255. Therefore, for example, if the threshold value is set at 90, then all pixels that are greater than or equal to 90 are assigned (1) and the rest are assigned (0). Thus, if the cutoff value is set to correspond to a degree of toning for a particular preset lighting condition, then all pixels less than the cutoff intensity are either part of a Lustre Interruption Mark or toned.

As noted above, pixels that comprise LIMs are more sensitive to changes in light intensity and angle of light beam incidence than toned pixels. Therefore, the processor next lowers the conical reflector a predefined distance, e.g., 4″, 130 "Lower Conical Reflector N Inches," and acquires a second grey scale image I2 of the coin surface, 132 "Acquire Image I2." Lowering of the reflector is accomplished by sending the appropriate instructions from the computer to the stepper motor controlling the position of the conical reflector relative to the coin surface. Next, the processor thresholds grey scale image I2 to binary image B2, 134 "Threshold I2 to B2," which is accomplished in a manner similar to the thresholding of instruction 128. The two binary images thus obtained are compared at inquiry 136 (B1 and B2) and [Abs(I1−I2)≧Cutoff]?" If the intensity is lower than the threshold intensity and the absolute value of (I1−I2) is less than the predefined cutoff value, then the pixels are labeled toned, otherwise they are labeled untoned. Toned pixels are assigned value (1) and untoned pixels are assigned value (0). The resultant binary image is then used as a template for imaging through the toning when the toned lustrous coin is graded. This essentially requires that adjustments be made to light intensity and angle of light beam incidence. If the answer to inquiry 136 is "yes," the processor grades the lustrous untoned coin, 138 "Grade Lustrous Untoned Coin," and if "no," then it grades the lustrous toned coin, 140 "Grade Lustrous Toned Coin." After a coin has been graded return is made to FIG. 8 where processing is terminated.

Figure 11:
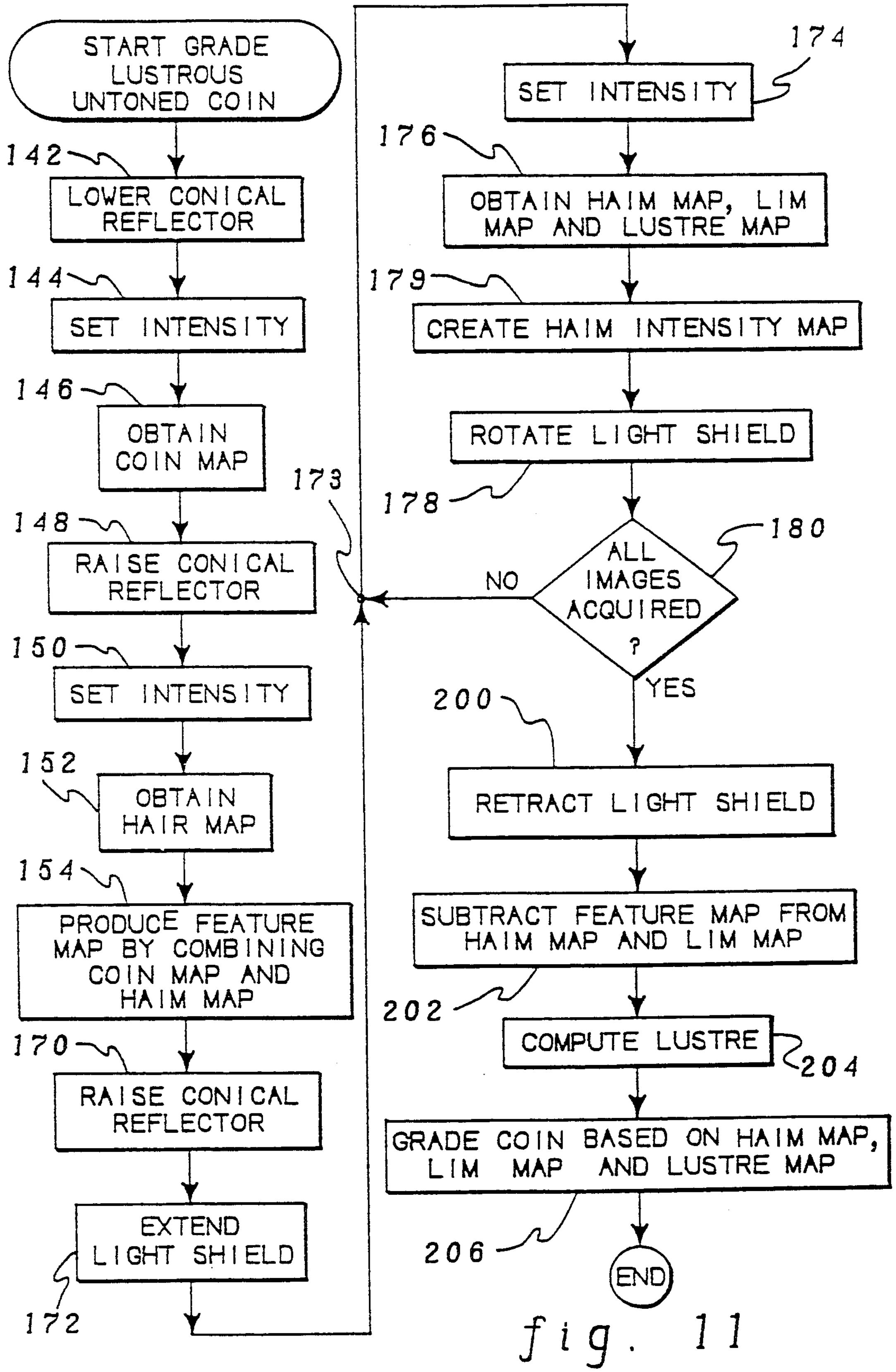
FIG. 11 is a flow diagram of one method of grading a lustrous untoned coin pursuant to the present invention.

FIG. 11 depicts one illumination and evaluation method for grading a lustrous untoned coin.

In general, the first step in evaluating a coin surface (pursuant to the novel approach of the present invention) is to create a map of the features of the coin under evaluation. By extracting features from the object surface itself there is no need to rely on a prestored ideal or reference coin image. Such an approach would disadvantageously require precise alignment of the coin and the reference image. Further, there are often variations in coin features of the same type which are sufficient to render an "ideal" coin an impossibility. Thus, the first object of applicants' evaluation process is to create a coin feature map. The majority of coin features are best illuminated with a light beam having a having perpendicular angle of incidence range or a grazing angle of incidence, for example, generated by moving the conical reflector to within 2″ or less of the coin surface. Preferably, the perpendicular angle of incidence range is close to 90° from the surface normal, i.e., almost parallel to the coin surface. At this spacing, however, certain features, such as the hair outline on the head of a Morgan silver dollar, are not contrasted well and are therefore difficult for the camera to detect. Thus, the perpendicular angle of incidence range is lowered by raising the conical reflector slightly (e.g., 1-2″) to better reflect the hair outline. These two coin characteristic maps are then combined into a single coin feature map. This process is outlined by the instructions of blocks 142-154 in FIG. 11. (Note that at the grazing angles of incidence discussed here, no detracting marks are believed capable of being imaged, at least not for an uncirculated coin.)

Figure 12:
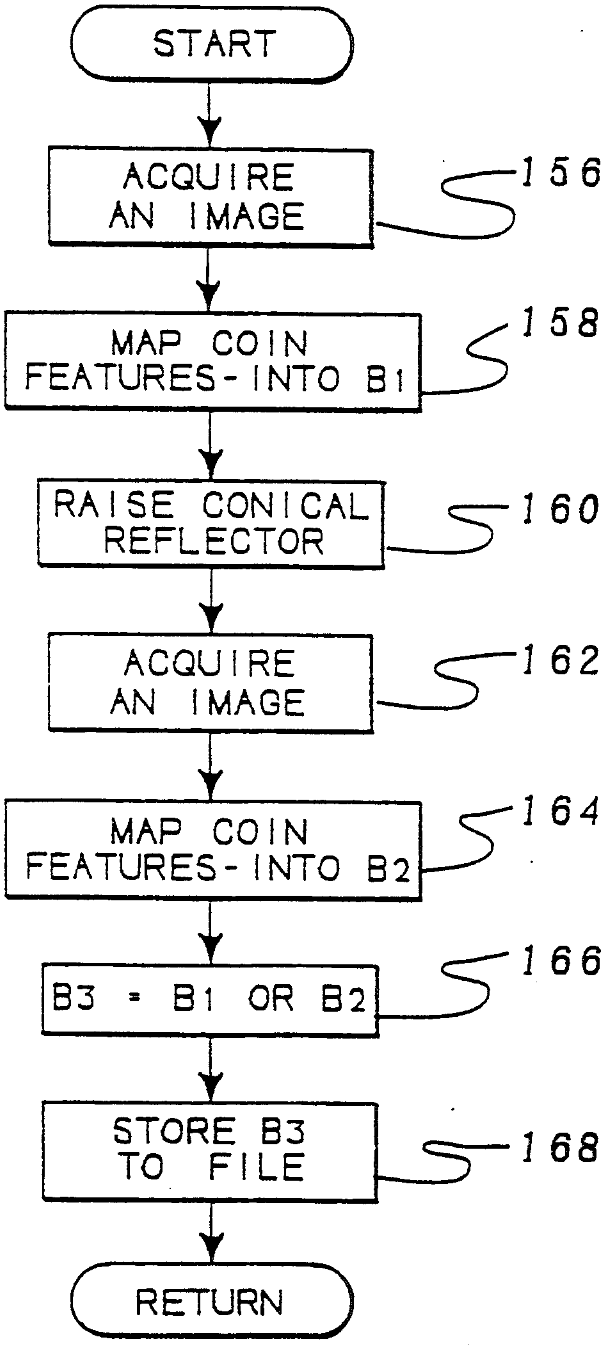
FIG. 12 is a flow diagram of one method of producing a coin features map pursuant to the present invention.

Specifically, the processor is first directed to lower the conical reflector such that the light beam falling on the coin surface has a low angle of incidence, 142 "Lower Conical Reflector." Next, the intensity of the light source is set, 144 "Set Intensity." The mean intensity of the coin surface is set to a desired, predetermined value. Thus, for a dark coin the intensity of the light source is raised and for a bright coin the light source intensity is lowered to maintain a desired coin surface intensity. Once the intensity is set, a coin map is obtained, 146 "Obtain Coin Map." After the coin map is obtained, the processor is directed to raise the conical reflector, for example, approximately 1-2″, 148 "Raise Conical Reflector," reset the light intensity to the selected mean intensity value, 150 "Set Intensity", and obtain a hair feature map, 152 "Obtain Hair Map." A feature map is then produced by combining the coin map and the hair map, 154 "Produce Feature Map by Combining Coin Map and Hair Map." A more detailed explanation of this processing is depicted in the flowchart of FIG. 12.

As shown, the processor starts to define a feature map by acquiring a grey scale image of the coin surface into memory I1, 156 "Acquire An Image." The pixels in I1 whose values lie, for example, between 90 and 255 are then segmented into binary image B1 as value (1), 158 "Map Coin Features Into B1." This map will include most of the coin features. After raising the conical reflector, 160 "Raise Conical Reflector," a second coin surface image is acquired into image memory I2, 162 "Acquire An Image." This grey scale image is then mapped into binary image B2 by segmenting those pixels whose values lie, for example, between 80 and 255. Note that the window of selectivity is slightly modified due to the change in light beam incidence resulting from raising the conical reflector. The second binary map will contain those features missed at instruction 158. Binary maps B1 and B2 are then logically OR'ed to form the coin feature map, 166 "B3=B1 OR B2." The completed coin feature map is stored in a file, 168 "Store B3 to File," after which return is made to the processing steps of FIG. 11.

One method for optically evaluating the strength of strike of a coin is to count the pixels assigned value (1) in a selected area of the coin feature map. The selected area is preferably chosen to coincide with the thickest part of the coin. If the strike is weak, metal will not completely fill a die at the thickest part of the coin during the minting process and consequently coin features will be absent and the pixel count will be low. The converse is true for a well struck coin. A scale is established by examining a number of coins of varying strength of strike and noting the variation in the pixel count.

After producing the features map, the processor raises the conical reflector approximately 5" to a distance of about 8-10" from the coin surface, 170 "Raise Conical Reflector." The light shield is then extended, 172 "Extend Light Shield," to a position substantially coaxial with the optical axis. Next, the processor resets the light intensity, 174 "Set Intensity," and produces a High Angle Impact Mark map, a Lustre Interruption Mark map and a Lustre map, 176 "Obtain HAIM Map, LIM Map and Lustre Map." Procedures for obtaining the High Angle Impact Mark map and the Lustre Interruption Mark map are set forth in FIGS. 13 and 14, respectively. These figures are discussed below. To complete one pass through loop 177, the processor is directed to create a High Angle Impact Mark intensity map, 179 "Create HAIM Intensity Map," rotate the light shield, 178 "Rotate Light Shield," and thereafter to inquire whether all images have been acquired, 180 "All Images Acquired?" If "no", then the processor returns to junction 173 for another pass through loop 177. As discussed above, the light shield will continue to be rotated until the coin surface has been sequentially illuminated from substantially 360° about the coin surface.

Figure 13:
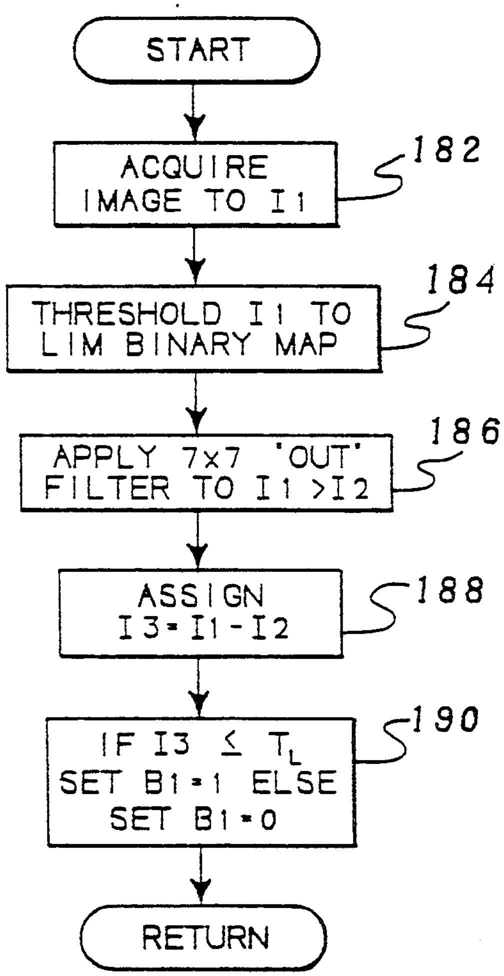
FIG. 13 and 14 are flow diagrams of one embodiment of producing the Lustre Interruption Mark and High Angle Impact Mark maps, respectively, of the evaluation method of the present invention.

Referring now to FIG. 13, one flow diagram for producing the Lustre Interruption Mark map, i.e., a map of those marks whose surfaces are nearly parallel to the coin surface, is provided. The processor is first directed to acquire an image of the coin surface to grey scale memory I1, 182 "Acquire Image to I1." The very dark pixels are then mapped to a LIM binary map, 184 "Threshold I1 to LIM Binary Map." This process maps the most severe Lustre Interruption Marks regardless of size. A 7×7 'Out' filter is then applied to detect small areas, i.e., groups of pixels, that are different from their immediate surroundings. This OUT filter is a 7×7 convolution mask or array that can be written as:

```
1 1 1 1 1 1 1
1 1 1 1 1 1 1
1 1 0 0 0 1 1
1 1 0 0 0 1 1= OUT[i,j]
1 1 0 0 0 1 1
1 1 1 1 1 1 1
1 1 1 1 1 1 1
```

OUT filters and their uses are well known to those skilled in the image processing field. The filtered result is assigned to memory I2. Next, the image generated by the OUT filter is subtracted from the image stored in memory I1, 188 "Assign I3=I1−I2." Memory I3 is then thresholded to LIM map, 190 "If I3≦$T_L$ set B1=1, Else Set B1=0" (wherein $T_L$=threshold value for Lustre Interruption Marks). The next step is a logical "OR" process such that the results of instruction 184 are included.

The High Angle Impact Mark map produced at step 176 is a binary image of the HAIMs. Because this map is binary, it contains no information about the intensity or severity of the High Angle Impact Marks. Thus, a High Angle Impact Mark intensity map must be produced. The processor creates a grey level image in memory I3, 179 "Create HAIM Intensity Map," as each High Angle Impact Mark is identified and mapped into a binary image B1 in step 176. For each pixel assigned value (1) in the binary HAIM map, the intensity of the corresponding pixel is added to grey image I3. This concept is represented as follows:

```
If (B1 = 1)
  Then I3 = I1 + I3
```

The process is repeated until the rotation of the light shield has been completed as described below. Subsequent thresholding I3 to LIM map, the processor returns to the flow diagram of FIG. 11 at instruction 178 "Rotate Light Shield." As noted above, in one preferred embodiment, two diametrically opposed radial slots are provided in the light shield. Each opening has approximately a 30° arc. Thus, six rotations of the light shield and six images are required to ensure that the surface is illuminated from every direction about the coin. (Obviously, other light shield slot configurations are possible, wherein a different number of light shield rotations and image acquisitions would be necessary.)

Figure 14:
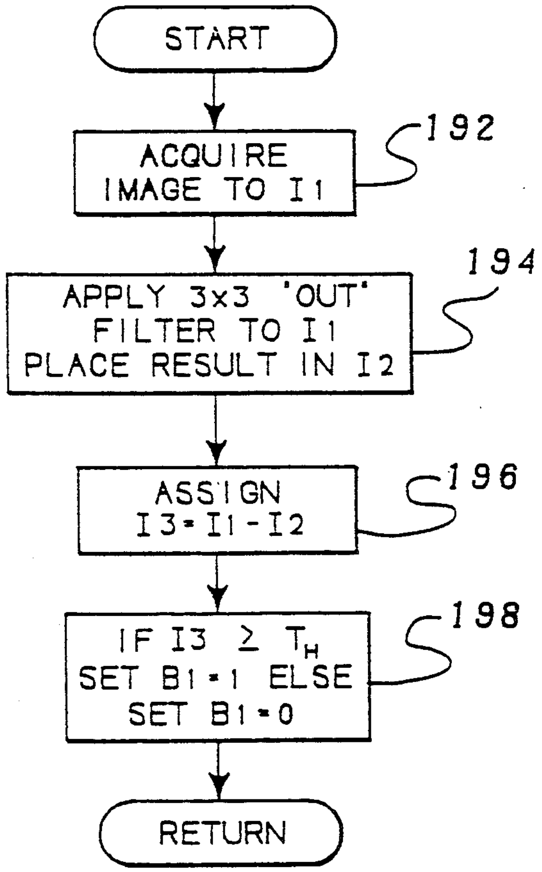
Figure 15A:
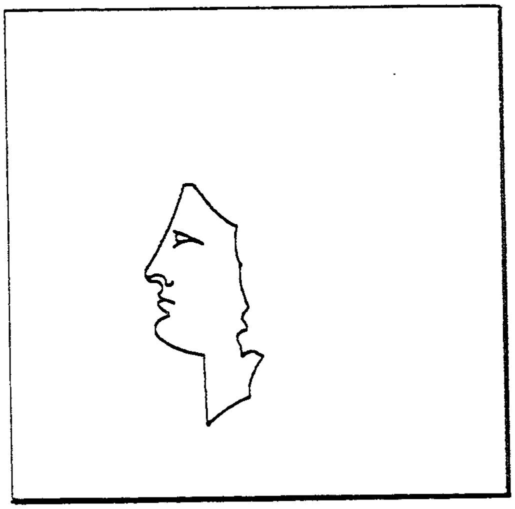
FIGS. 15A–15D depict the face, field, hair and letters regions on the obverse surface of a Morgan silver dollar.
Figure 15B:
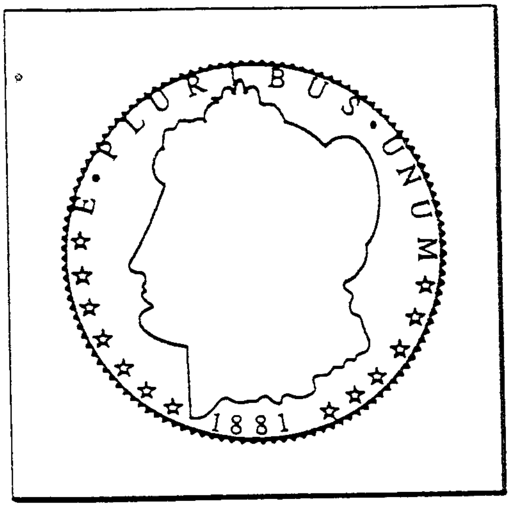
Figure 15C:
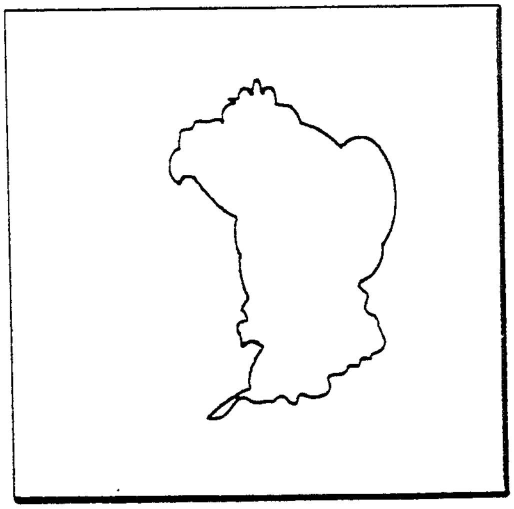
Figure 15D:
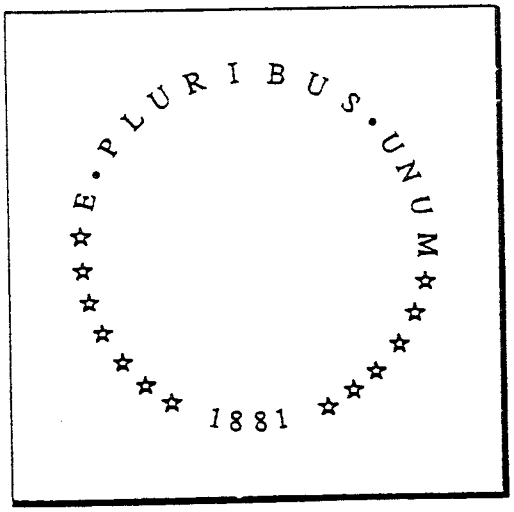

Simultaneous with the creation of the Lustre Interruption Mark map, the processor produces a High Angle Impact Mark map. FIG. 14 depicts one process for creating such a map. The first step is to acquire a grey scale image of the coin surface to memory I1, 192 "Acquire Image to I1." A 3×3 OUT filter is then applied to image I1 and the result is placed in memory I2, 194 "Apply 3×3 'Out' filter to I1. Place result in I2." Applicants have discovered that High Angle Impact Marks are typically small and appear as bright pixels against a dark background. The difference in memories I1 and I2 is assigned to memory I3, 196 "Assign I3=I1−I2," which is thresholded to the HAIM binary map, 198 "If I3≧$T_H$, Set B1=1, Else Set B1=0." Return is then made to the processing steps of FIG. 11 at instruction 178.

While rotating the light shield and acquiring images for the LIM map as described above, the processor is also generating a pair of images which are used to create the coin's lustre map. Copies of the first grey scale image used to create the LIM map (i.e., at instruction 182) are placed in grey level image memories I4 and I5. During each subsequent rotation of the light shield, each pixel value of each acquired image is compared to the value of the corresponding pixels in image memories I4 and I5. If the intensity of the pixel in the new image is less than the intensity of the corresponding pixels in I4, the intensity value of the new image is copied into memory I4. Similarly, if the intensity of the pixel in the image is greater than the corresponding pixel intensity in memory I5, the new pixel value is copied into memory I5. At the end of the light shield rotation, each pixel of memory I4 contains the minimum value of that pixel for all acquired images and memory I5 contains the maximum value for that pixel for all acquired images. After image I4 is subtracted from image I5, the resulting image is a map of the lustre at each point on the coin. The operations, for each rotation of the light shield, can be represented by the following formulas:

If (I1<I4) then value I4=I1

If (I1>I5) then I5=I1

After rotation of the light shield is completed:

I6=I5−I4

The grey scale image I6 is a map of the coin surface mint lustre.

An alternate, perhaps preferred approach to calculating mint lustre is to ascertain the standard deviation of intensity of the successive images at each pixel. This can be accomplished by summing the grey scale values for each pixel for each of the coin surface images obtained and dividing the total by the number of images obtained to produce a mean value. The mean value is then subtracted from each grey scale pixel value of the surface images and the differences are squared and summed to ascertain the standard deviation. Standard deviation has been found to vary linearly with changes in surface lustre.

If the answer to inquiry 180 is "yes", i.e., the light shield has completed its rotation, the processor retracts the light shield back to its home position, 200 "Retract Light Shield." The features map is then subtracted from the binary HAIM and LIM maps to remove all coin features that may have inadvertently imaged into these maps, 202 "Subtract Features Map From HAIM Map and LIM Map." Next, the processor computes a numerical lustre value by calculating the standard deviation of the lustre map generated at step 176 as described above, 204 "Compute Lustre."

The last step in the evaluation process of an untoned lustrous coin surface is to grade the surface based on the obtained HAIM map, LIM map, and Lustre Value, 206 "Grade Coin Based on HAIM map, LIM map, and Lustre Value." One method for grading the coin when presented with this information is described in detail in the cross-referenced case. Another approach to producing a coin grade is set forth below.

The High Angle Impact Mark intensity map is used to compute the mean intensity of the HAIM's and thereby provide an indication of each detracting mark's brightness. In a similar manner, the mean intensity of the Lustre Interruption Marks is calculated from the Lustre map. The severity of the LIM's is inversely proportional to the intensity of the corresponding pixels in the lustre map. The darker the region, the worst the defect. As in the first case, the location and severity of each detracting mark is then used to assign a numeric value to the coin surface, which is ultimately translated through a prestored table into a numismatic grade.

An alternate grading approach to that described in the incorporated case of locating each detracting mark, is to consider that the severity of the mark is proportional to the distance of the mark from a coin design feature. For example, a detracting mark in the hair of a Morgan silver dollar is much less noticeable than a similar detracting mark on the center of the cheek. Therefore, the X,Y coordinates of the detracting marks and the stored features map may be used to calculate the distance of the shortest line that can be drawn from the mark to a coin feature. The longer the line is, the more noticeable and severe the defect. As a further enhancement, the distance can be adjusted for the region in which the mark is located. For example, penalty points may be assigned to the four regions illustrated in FIGS. 15A-15D as follows:

If (region=face), distance penalty points=10

If (region=field), distance penalty points=8

If (region=hair), distance penalty points=1

If (region=letters), distance penalty points=1

HAIM and LIM penalty points are then calculated for each defect by multiplying the area of the defect times its intensity, and times the distance penalty points.

It will be observed from the above that this invention fully meets the objectives set forth herein. An illumination system and evaluation method for accurately imaging features, defects, etc. on the surface of an object is provided. Further, the illumination system is capable of applying well-controlled beams of light at varying angles of incidence to the object's surface. Further, the system and method presented herein are capable of facilitating the objective, automated grading and/or fingerprinting of a coin. Lastly, a novel method for accurately quantifying surface lustre of an object is presented.

Although several embodiments have been illustrated in the accompanying drawings and described the foregoing detailed description, it will be understood that the invention is not limited to the particular embodiments discussed but is capable of numerous rearrangements, modifications and substitutions without departing from the scope of the invention. The following claims are intended to encompass all such modifications.

What is claimed is:

1. A system for uniformly illuminating a surface of a target object with light at varying angles of incidence relative to the object surface and the optical axis of a viewing means, said system comprising:

a light source positioned coaxial with the optical axis, said light source being spaced from said target object and located relative thereto such that direct light from said source is blocked from reaching said surface of the object;

first means for reflecting light from said source in a pattern substantially concentric with the optical axis;

second means for reflecting light from said source towards said surface of the target object, said second reflecting means being positioned in the path of the substantially concentric light pattern reflected from said first reflecting means; and means for varying the spacing of the second reflecting means from the target object.

2. The illuminating system of claim 1, wherein said first reflecting means collimates light from said source in a pattern concentric with the optical axis.

3. The illuminating system of claim 2, wherein said first reflecting means comprises a paraboloidal reflector and the light source is located at the focus of said reflector.

4. The illuminating system of claim 3, further comprising means for blocking light from said source from directly reaching said object.

5. The illuminating system of claim 4, wherein said blocking means includes means for supporting the target object such that said surface of the object intersects the optical axis in an opposing relation to said viewing means.

6. The illuminating system of claim 4, wherein the cross-sectional area of said paraboloidal reflector at its open end is larger than the blocking area of said light blocking means.

7. The illuminating system of claim 2, wherein said second reflecting means comprises a conical reflector.

8. The illuminating system of claim 7, wherein said conical reflector includes an inner matte surface, said matte surface being positioned to uniformly reflect light towards the target object surface.

9. The illuminating system of claim 8, wherein the target object comprises a coin and wherein the system further comprises the viewing means, said viewing means being directed along the optical axis towards said surface of the coin and substantially coaxial with said first reflecting means and said second reflecting means.

10. The illuminating system of claim 2, further comprising a movable light shield, said light shield having a retracted position wherein none of said substantially concentric light pattern from said first reflecting means is blocked by said shield and an extended position wherein said shield is substantially coaxial with said light source and said target object such that said substantially concentric light pattern from said first reflecting means is partially blocked from reaching said second reflecting means, said light shield having at least one opening therein sized to allow the passage a beam of light therethrough, said emitted light beam being parallel to said optical axis and defined from a portion of said substantially concentric light pattern.

11. The illuminating system of claim 10, wherein when in said extended position said light shield is coaxial with said optical axis and rotatable thereabout such that the direction of said uniform light beam reflected from said second reflecting means relative to said object surface is varied with rotation of said shield.

12. The illuminating system of claim 1, wherein said light source, first reflecting means, second reflecting means, and target object are substantially coaxial with the optical axis of the viewing means and vertically aligned.

13. The illuminating system of claim 12, wherein said first reflecting means is located below said target object, with said light source disposed therebetween, and said second reflecting means is located above said target object for reflecting light received from said first reflecting means downward onto said surface of the target object.

14. The illuminating system of claim 13, wherein said second reflecting means has a central opening therein coaxial with the optical axis to allow the viewing means to optically scan said surface of the target object therethrough.

15. The illuminating system of claim 14, further comprising a movable light shield, said light shield having a retracted positioned wherein none of said substantially concentric light pattern from said first reflecting means is blocked by said shield and an extended position wherein said shield is substantially coaxial with said light source and said target object such that said substantially concentric light pattern reflected from said first reflecting means is partially blocked from reaching said second reflecting means, said light shield being disposed between said first reflecting means and said second reflecting means, said light shield having an opening therein sized to allow the passage of a beam of light therethrough, said emitted light beam being parallel to said optical axis and defined from a portion of said substantially concentric light pattern.

16. The illuminating system of claim 15, wherein said light shield opening comprises a radial opening such that said light beam consists of an arc of said substantially concentric light pattern.

17. The illuminating system of claim 16, further comprising two diametrically opposed radial openings in said light shield such that two discrete light beams are reflected from said first reflecting means to said second reflecting means.

18. The illuminating system of claim 17, wherein said radial openings are each approximately 30°.

19. The illuminating system of claim 1, wherein said substantially concentric light pattern reflected from said first reflecting means is spatially concentric with said optical axis.

20. The illuminating system of claim 1, wherein said substantially concentric light pattern reflected from said first reflecting means is spatially concentric with said optical axis when viewed over a predefined period of time.

* * * * *